(12) United States Patent
Shin et al.

(10) Patent No.: US 12,069,668 B2
(45) Date of Patent: Aug. 20, 2024

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Seokmin Shin, Seoul (KR); Seonwook Kim, Seoul (KR); Suckchel Yang, Seoul (KR); Sechang Myung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/296,169

(22) Filed: Apr. 5, 2023

(65) Prior Publication Data

US 2023/0262710 A1 Aug. 17, 2023

Related U.S. Application Data

(63) Continuation of application No. PCT/KR2021/014362, filed on Oct. 15, 2021.

(30) Foreign Application Priority Data

Oct. 15, 2020 (KR) .................. 10-2020-0133156
Jan. 14, 2021 (KR) .................. 10-2021-0005568
Apr. 14, 2021 (KR) .................. 10-2021-0048432

(51) Int. Cl.
*H04W 72/20* (2023.01)
*H04W 48/08* (2009.01)
(Continued)

(52) U.S. Cl.
CPC .......... *H04W 72/21* (2023.01); *H04W 48/08* (2013.01); *H04W 72/04* (2013.01)

(58) Field of Classification Search
CPC ...... H04W 72/21; H04W 72/04; H04W 48/08
See application file for complete search history.

(56) References Cited

U.S. PATENT DOCUMENTS 11,503,609 B2 * 11/2022 Yang .................. H04L 1/1819
11,528,699 B2 * 12/2022 Takeda ................ H04W 72/23
(Continued)

FOREIGN PATENT DOCUMENTS

WO WO 2020/247797 A1 * 12/2020 ............... H04L 1/18
WO WO 2021/067354 A1 * 4/2021 ............ H04W 74/08

OTHER PUBLICATIONS

Korean Intellectual Property Office Application No. 10-2023-7012610, Office Action dated Jan. 25, 2024, 4 pages.
(Continued)

*Primary Examiner* — Brian D Nguyen
(74) *Attorney, Agent, or Firm* — LEE, HONG, DEGERMAN, KANG & WAIMEY

(57) ABSTRACT

A method and apparatus for transmitting and receiving a signal in a wireless communication system, according to an embodiment of the present invention, comprise the steps of: receiving an SIB including information on a PUCCH resource; transmitting a PUCCH on the basis of the information on the PUCCH resource in a state in which user equipment does not have dedicated PUCCH resource configuration; and after an RRC connection is established, monitoring the PDCCH on the basis of a configured DRX operation. The information on the PUCCH resource may include information on the number of PRBs of the PUCCH resource.

8 Claims, 21 Drawing Sheets

(51) Int. Cl.
    *H04W 72/04*     (2023.01)
    *H04W 72/21*     (2023.01)

(56) References Cited

U.S. PATENT DOCUMENTS

| | | | |
|---|---|---|---|
| 2021/0160964 A1* | 5/2021 | Sun | H04L 25/0226 |
| 2021/0250944 A1* | 8/2021 | Ji | H04L 5/0055 |
| 2022/0104138 A1* | 3/2022 | Park | H04L 5/0094 |
| 2023/0087223 A1* | 3/2023 | Jang | H04L 1/08 370/329 |

OTHER PUBLICATIONS

Ericsson, "Feature lead summary for UL Signals and Channels", R1-1913521, 3GPP TSG-RAN WG1 Meeting #98b, Aug. 2019, 38 pages.
Ericsson, "UL Signals and Channels", R1-2000825, 3GPP TSG-RAN WG1 Meeting #100-e, Mar. 2020, 10 pages.

* cited by examiner

[Fig. 1]
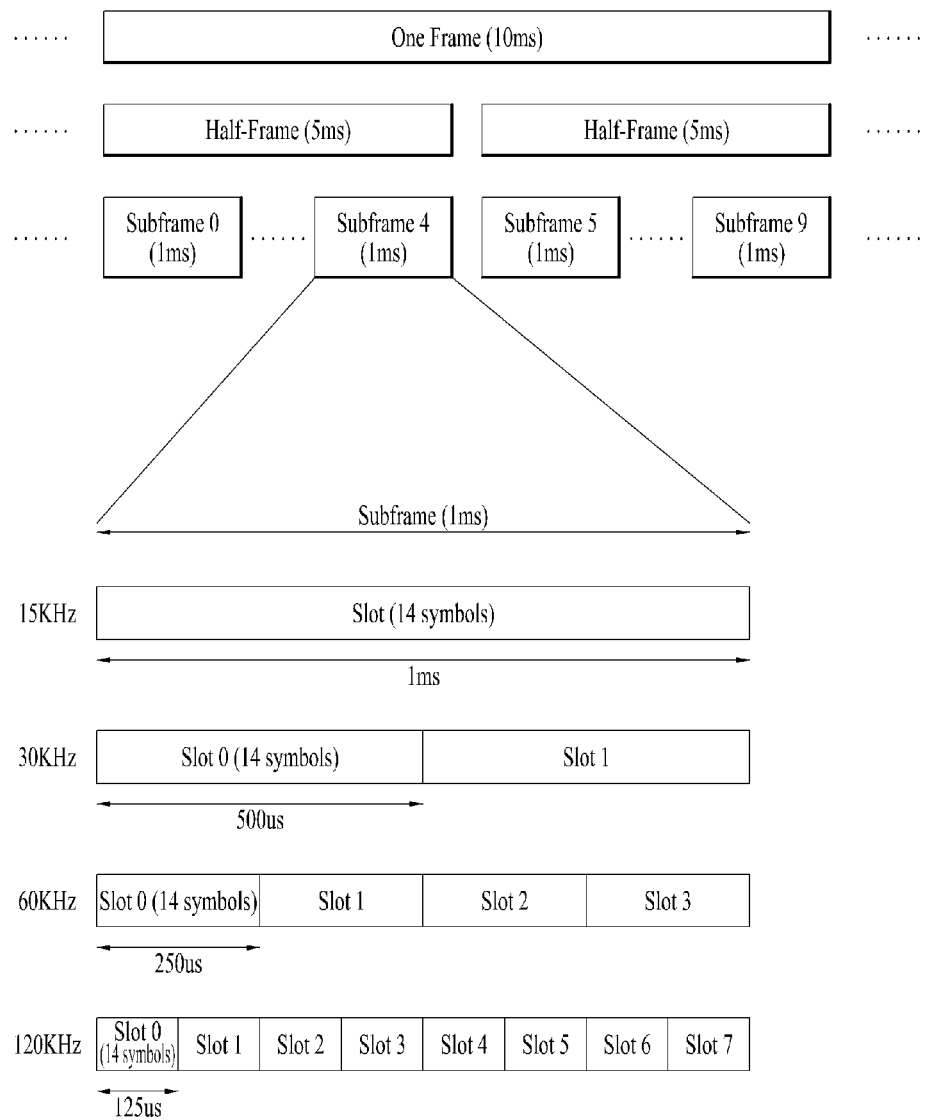

[Fig. 2]
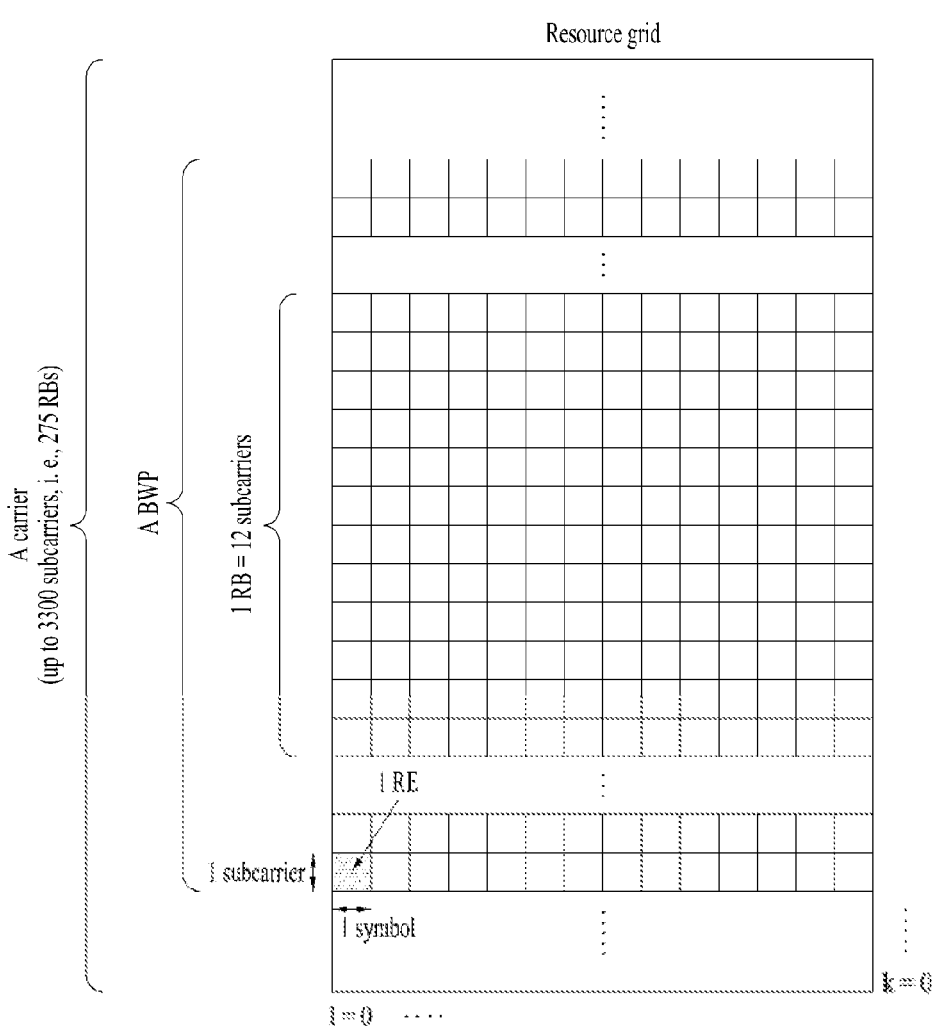

【Fig. 3】
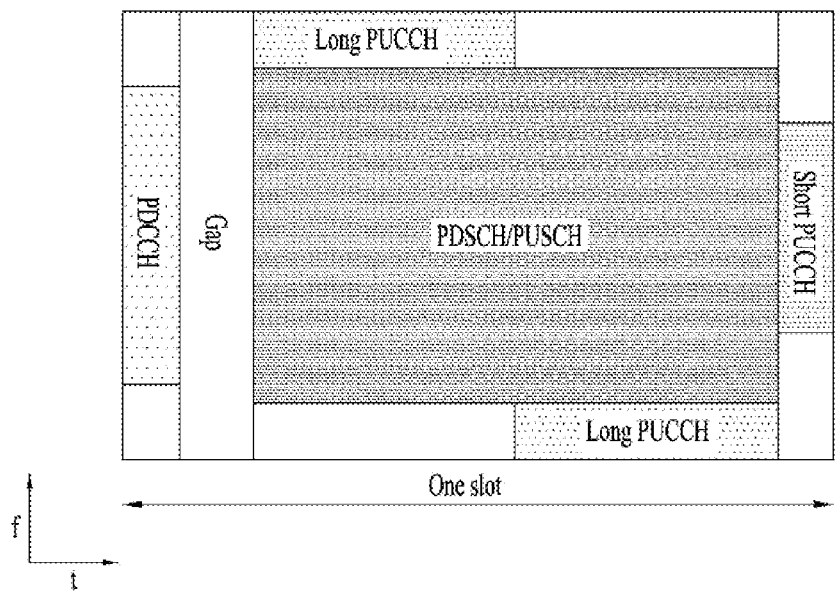
【Fig. 4】
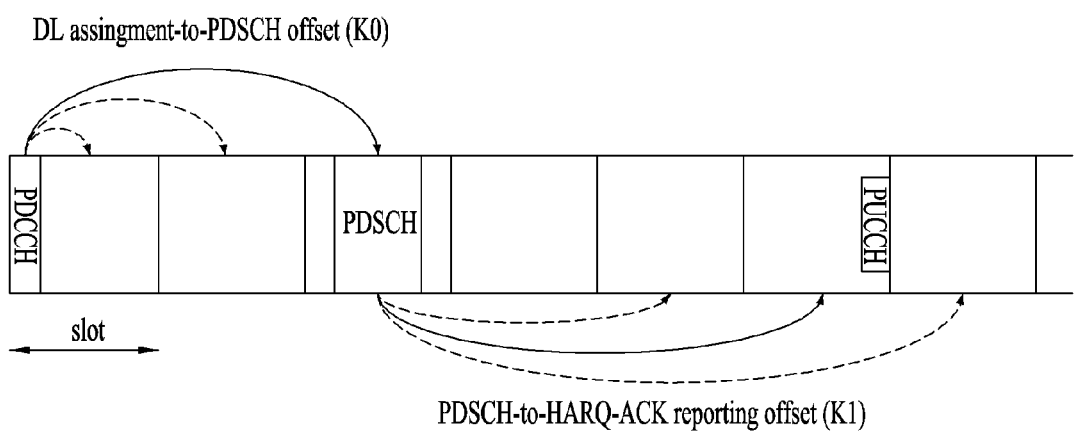

[Fig. 5]
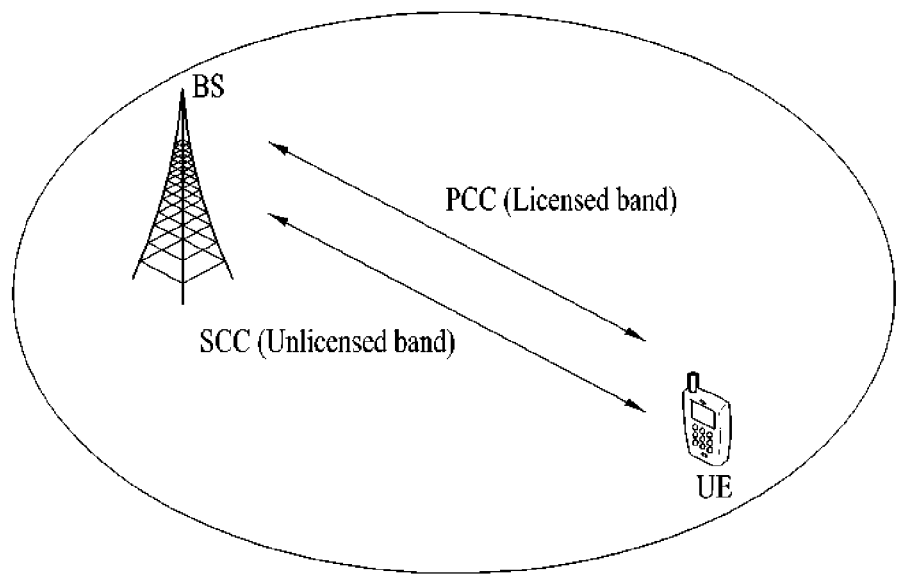
(a) Carrier aggregation between L-band and U-band
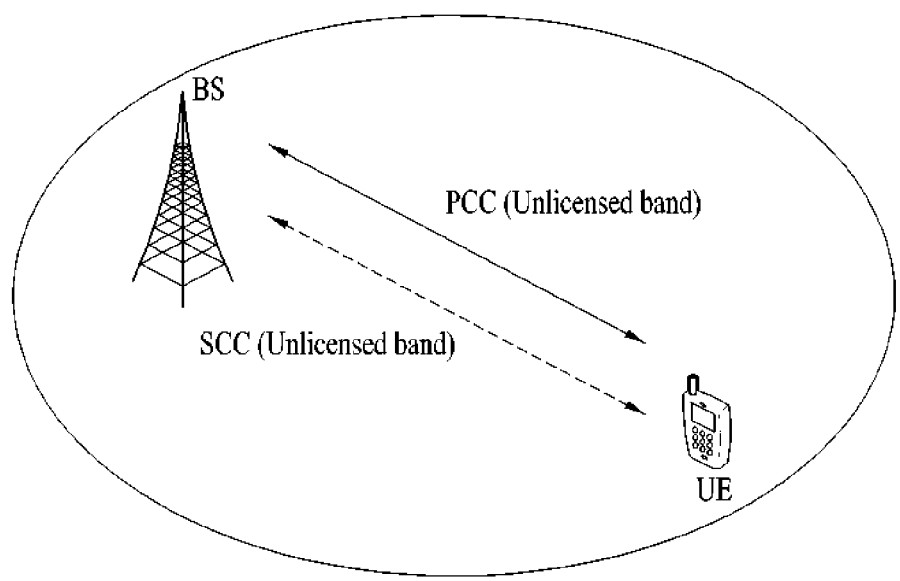
(b) Standalone U-band(s)

【Fig. 6】
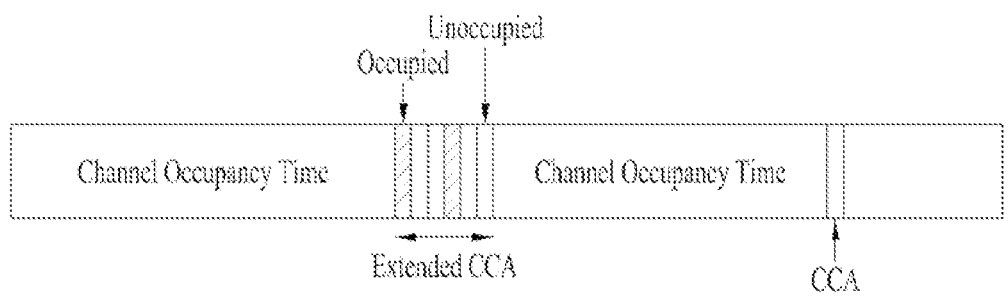
【Fig. 7】
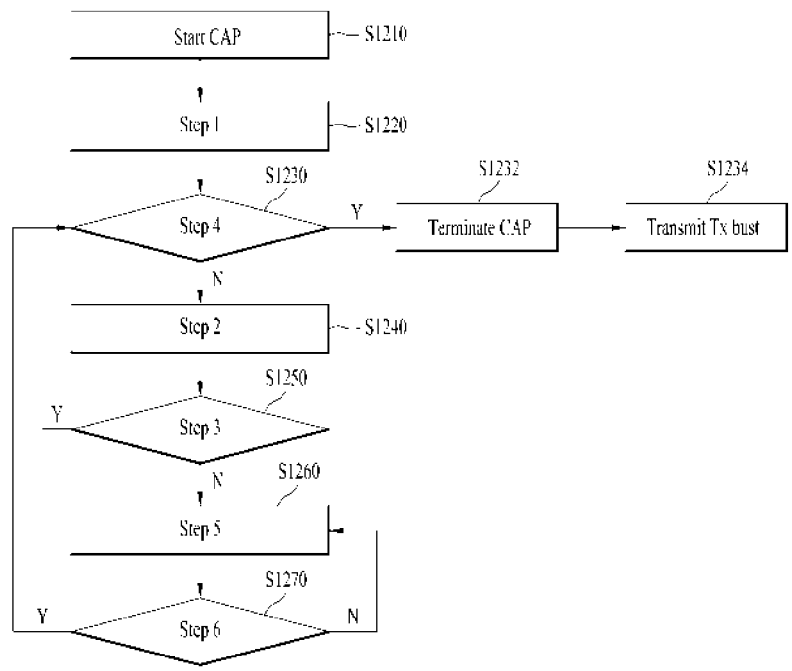

【Fig. 8】
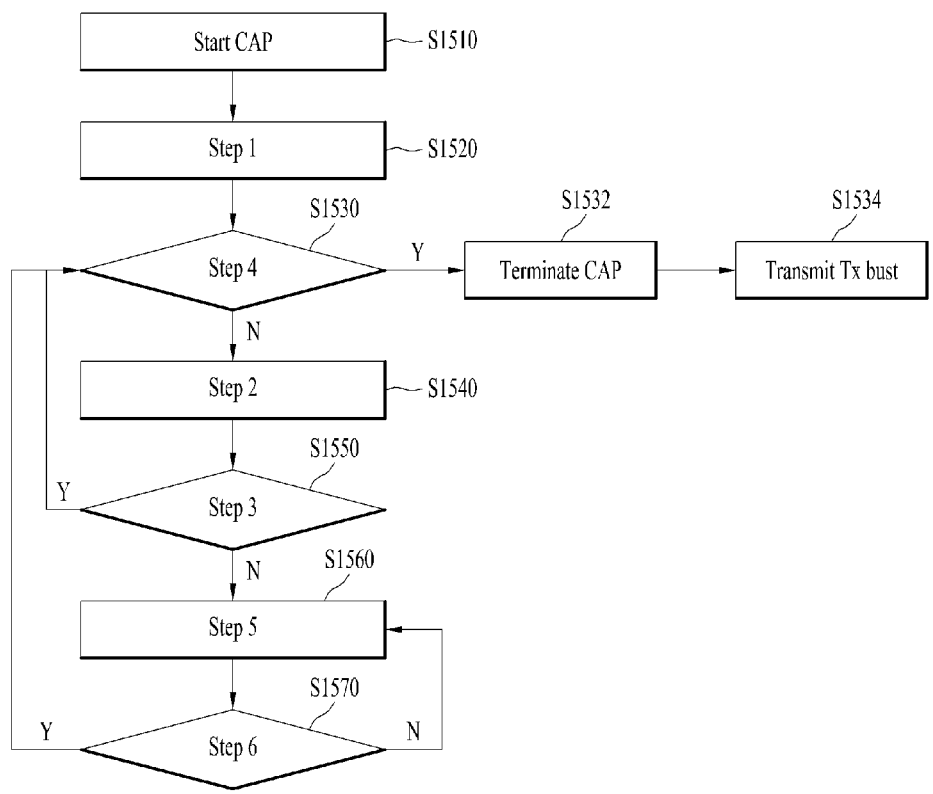

[Fig. 9]
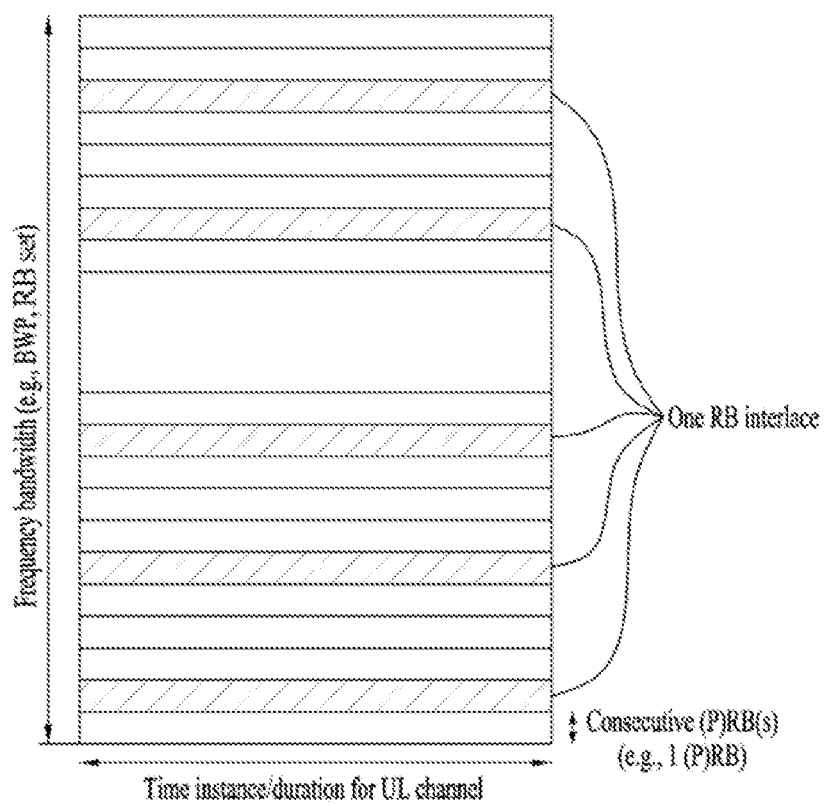

[Fig.10]

| PS #1 | PS #2 | PS #3 | PS #4 | PS #5 | PS #6 | PS #7 | PS #8 | PS #9 | PS #10 | PS #11 | PAPR | CM |
|---|---|---|---|---|---|---|---|---|---|---|---|---|
| 1 | 1 | 1 | -1 | -1 | -1 | 1 | 1 | -1 | 1 | -1 | 2.894775 | 1.092 |
| 1 | 0+1i | -1 | 0+1i | -1 | 0+1i | -1 | 0+1i | -1 | 0+1i | 1 | 2.894775 | 1.092 |
| 1 | 1 | 1 | 1 | -1 | 1 | 1 | -1 | -1 | | -1 | 2.894775 | 1.092 |
| 1 | 0+1i | -1 | 0+1i | | 0+1i | -1 | 0+1i | -1 | 0+1i | 1 | 2.894775 | 1.092 |
| 1 | 1 | 1 | 0+1i | 1 | 1 | 1 | 0+1i | -1 | | -1 | 3.536278 | 1.496 |
| 1 | 1 | 1 | 0+1i | -1 | 1 | -1 | 0+1i | -1 | | 1 | 3.536278 | 1.496 |
| 1 | 0+1i | -1 | 1 | 1 | 0+1i | -1 | | -1 | 0+1i | 1 | 3.536278 | 1.496 |
| 1 | 0+1i | -1 | 1 | -1 | 0+1i | -1 | 1 | -1 | 0+1i | -1 | 3.536278 | 1.496 |
| 1 | 1 | -1 | 0+1i | | 1 | 1 | 0+1i | -1 | | 1 | 3.536278 | 1.496 |
| 1 | 1 | -1 | 0+1i | -1 | 1 | 1 | 0+1i | -1 | | -1 | 3.536278 | 1.496 |

[Fig.11]
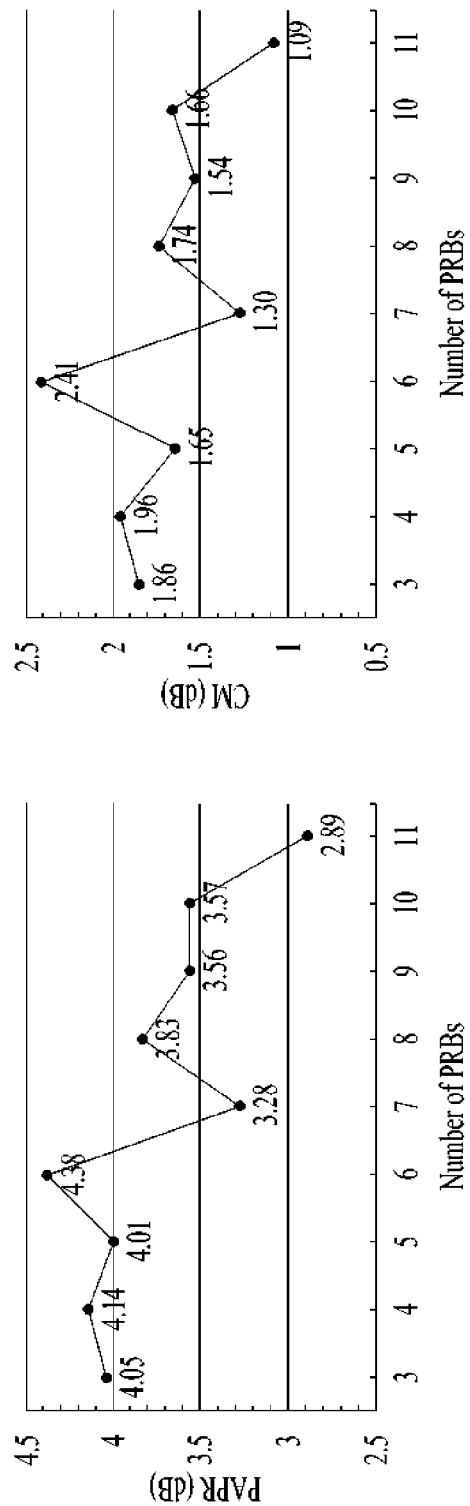

[Fig. 12]

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

[Fig. 13]

| Initial CS index | 0 | 3 | --hopping→ | 0 | 3 |
|---|---|---|---|---|---|
| High frequency RB | 8 | 9 | | 0 | 1 |
| | 10 | 11 | | 2 | 3 |
| | 12 | 13 | | 4 | 5 |
| | 14 | 15 | | 6 | 7 |
| ... | ... | ... | ... | ... | ... |
| | 6 | 7 | | 14 | 15 |
| | 4 | 5 | | 12 | 13 |
| | 2 | 3 | | 10 | 11 |
| Low frequency RB | 0 | 1 | | 8 | 9 |

[Fig. 14]

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 105} |
| 1 | 0 | 12 | 2 | 0 | {0, 140, 280} |
| 2 | 0 | 12 | 2 | 3 | {0, 140, 280} |
| 3 | 1 | 10 | 4 | 0 | {0, 210} |
| 4 | 1 | 10 | 4 | 0 | {0, 105, 210, 315} |
| 5 | 1 | 10 | 4 | 2 | {0, 105, 210, 315} |
| 6 | 1 | 10 | 4 | 4 | {0, 105, 210, 315} |
| 7 | 1 | 4 | 10 | 0 | {0, 210} |
| 8 | 1 | 4 | 10 | 0 | {0, 105, 210, 315} |
| 9 | 1 | 4 | 10 | 2 | {0, 105, 210, 315} |
| 10 | 1 | 4 | 10 | 4 | {0, 105, 210, 315} |
| 11 | 1 | 0 | 14 | 0 | {0, 210} |
| 12 | 1 | 0 | 14 | 0 | {0, 105, 210, 315} |
| 13 | 1 | 0 | 14 | 2 | {0, 105, 210, 315} |
| 14 | 1 | 0 | 14 | 4 | {0, 105, 210, 315} |
| 15 | 1 | 0 | 14 | $[N_{BWP}^{size}/4]$ | {0, 105, 210, 315} |

[Fig. 15]

| Index | PUCCH format | First symbol | Number of symbols | PRB offset $RB^{offset}_{BWP}$ | Set of initial CS indexes |
|---|---|---|---|---|---|
| 0 | 0 | 12 | 2 | 0 | {0, 51} |
| 1 | 0 | 12 | 2 | 0 | {0, 68, 136} |
| 2 | 0 | 12 | 2 | 3 | {0, 68, 136} |
| 3 | 1 | 10 | 4 | 0 | {0, 102} |
| 4 | 1 | 10 | 4 | 0 | {0, 51, 102, 153} |
| 5 | 1 | 10 | 4 | 2 | {0, 51, 102, 153} |
| 6 | 1 | 10 | 4 | 4 | {0, 51, 102, 153} |
| 7 | 1 | 4 | 10 | 0 | {0, 102} |
| 8 | 1 | 4 | 10 | 0 | {0, 51, 102, 153} |
| 9 | 1 | 4 | 10 | 2 | {0, 51, 102, 153} |
| 10 | 1 | 4 | 10 | 4 | {0, 51, 102, 153} |
| 11 | 1 | 0 | 14 | 0 | {0, 102} |
| 12 | 1 | 0 | 14 | 0 | {0, 51, 102, 153} |
| 13 | 1 | 0 | 14 | 2 | {0, 51, 102, 153} |
| 14 | 1 | 0 | 14 | 4 | {0, 51, 102, 153} |
| 15 | 1 | 0 | 14 | $[N^{size}_{BWP}/4]$ | {0, 51, 102, 153} |

【Fig. 16】

6.3.2.2.2 Cyclic shift hopping

The cyclic shift $\alpha$ varies as a function of the symbol and slot number according to $$\alpha_l = \frac{2\pi}{N_{sc}^{RB}}\left(\left(m_0 + m_{cs} + m_{int} + n_{cs}(n_{s,f}^\mu l + l')\right) \bmod N_{sc}^{RB}\right)$$

where

- $n_{s,f}^\mu$ is the slot number in the radio frame

- $l$ is the OFDM symbol number in the PUCCH transmission where $l = 0$ corresponds to the first OFDM symbol of the PUCCH transmission.

- $l'$ is the index of the OFDM symbol in the slot that corresponds to the first OFDM symbol of the PUCCH transmission in the slot given by [3, TS 38.213]

- $m_0$ is given by [5, TS 38.213] for PUCCH format 0 and 1 while for PUCCH format 3 and 4 is defined in clause 6.4.1.3.3.1

- $m_{cs} = 0$ except for PUCCH format 0 when it depends on the information to be transmitted according to clause 9.2 of [5, TS 38.213].

- $m_{int}$ is given by

- $m_{int} = 5n_{IRB}^\mu$ for PUCCH formats 0 and 1 if PUCCH shall use interlaced mapping according to any of the higher-layer parameters *useInterlacePUCCH-PUSCH* in *BWP-UplinkCommon* or *useInterlacePUCCH-PUSCH* in *BWP-UplinkDedicated*, where $n_{IRB}^\mu$ is the resource block number within the interlace;

- $m_{int} = 0$ otherwise

The function $n_{cs}(n_{s,f}^\mu, l)$ is given by $$n_{cs}(n_{s,f}^\mu, l) = \sum_{m=0}^{7} 2^m c\left(8 N_{symb}^{slot} n_{s,f}^\mu + 8l + m\right)$$

where the pseudo-random sequence $c(i)$ is defined by clause 5.2.1. The pseudo-random sequence generator shall be initialized with $c_{init} = n_{ID}$, where $n_{ID}$ is given by the higher-layer parameter *hoppingId* if configured, otherwise $n_{ID} = N_{ID}^{cell}$.

[Fig. 17]
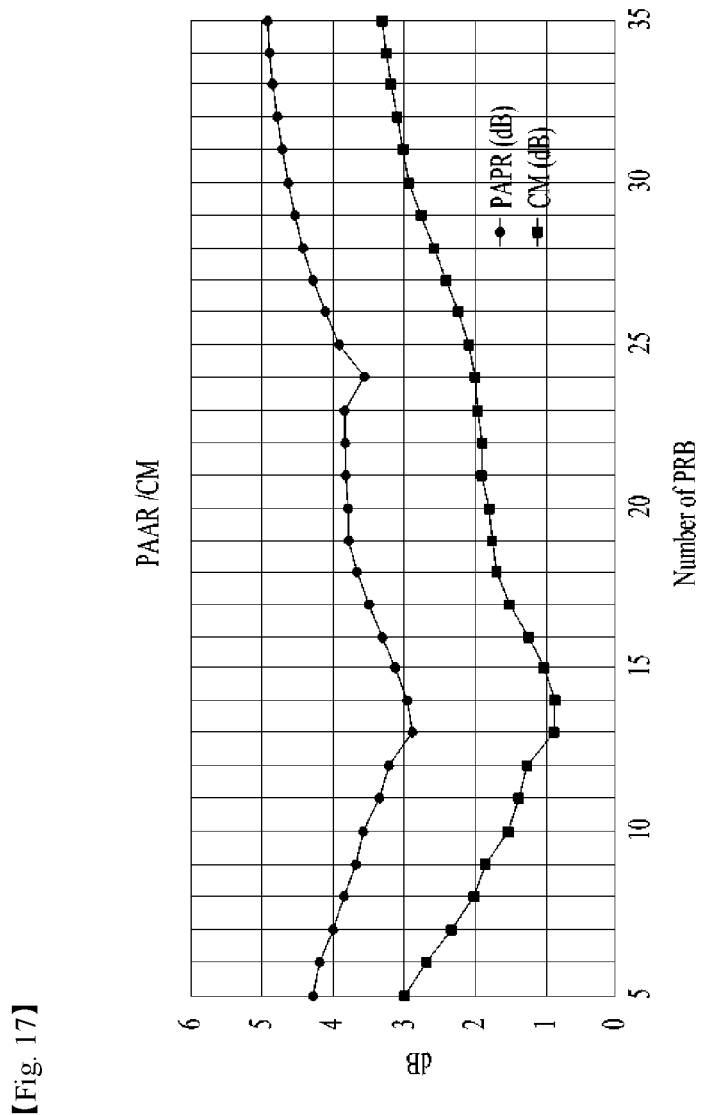

[Fig. 18]
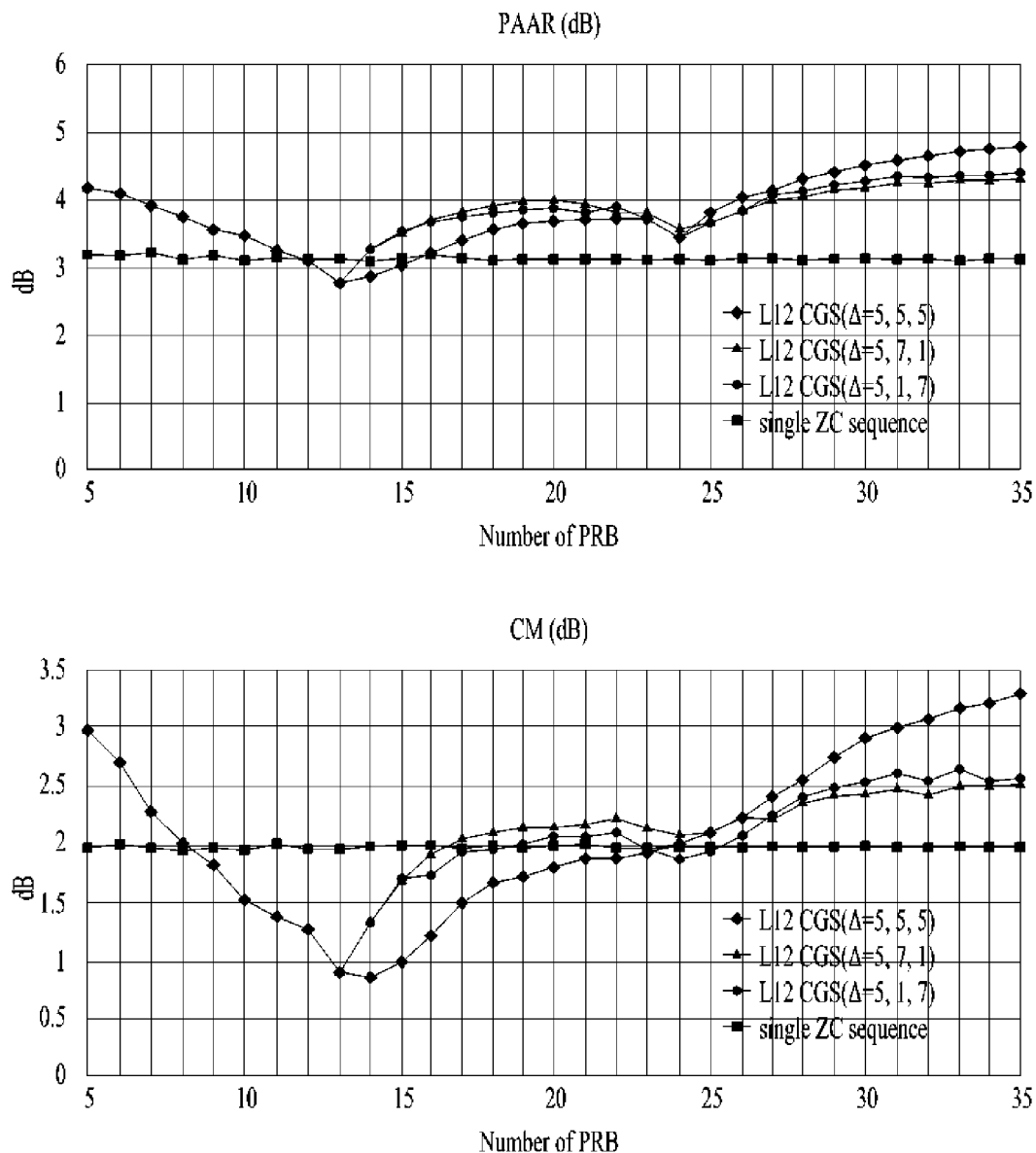

【Fig. 19】
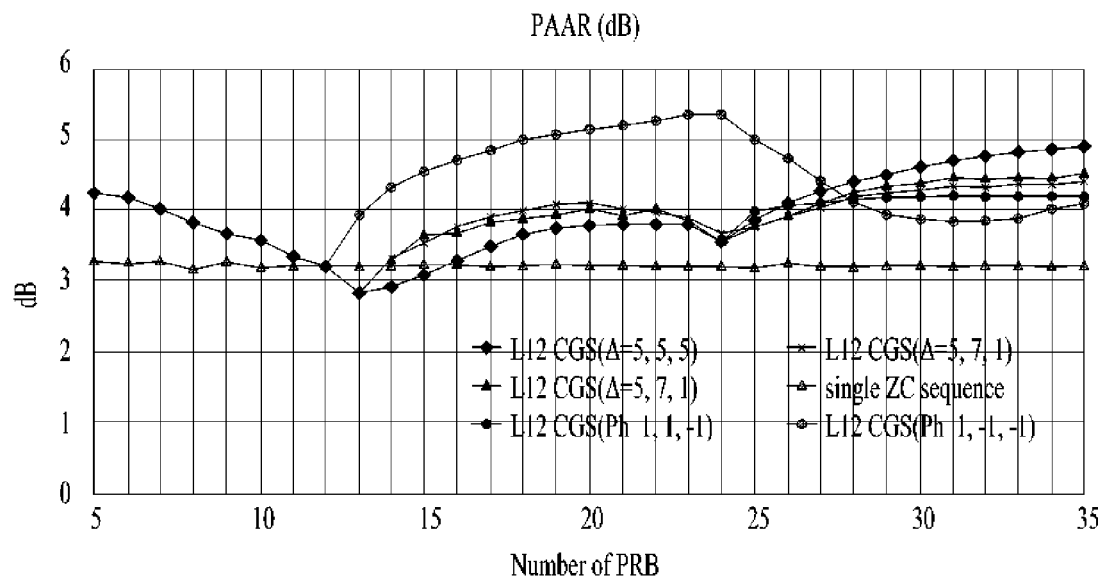
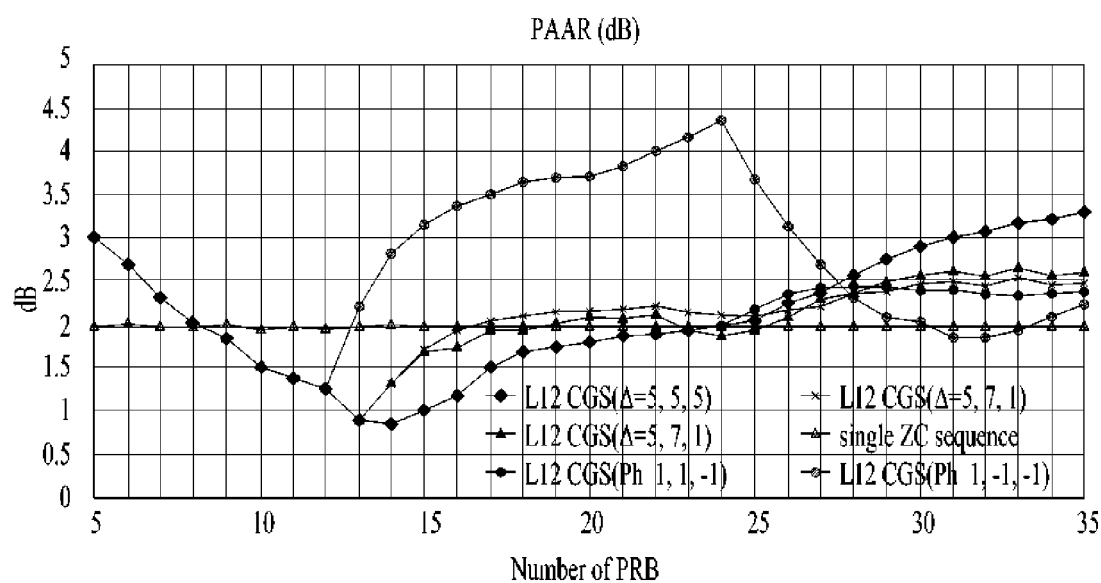

[Fig. 20]
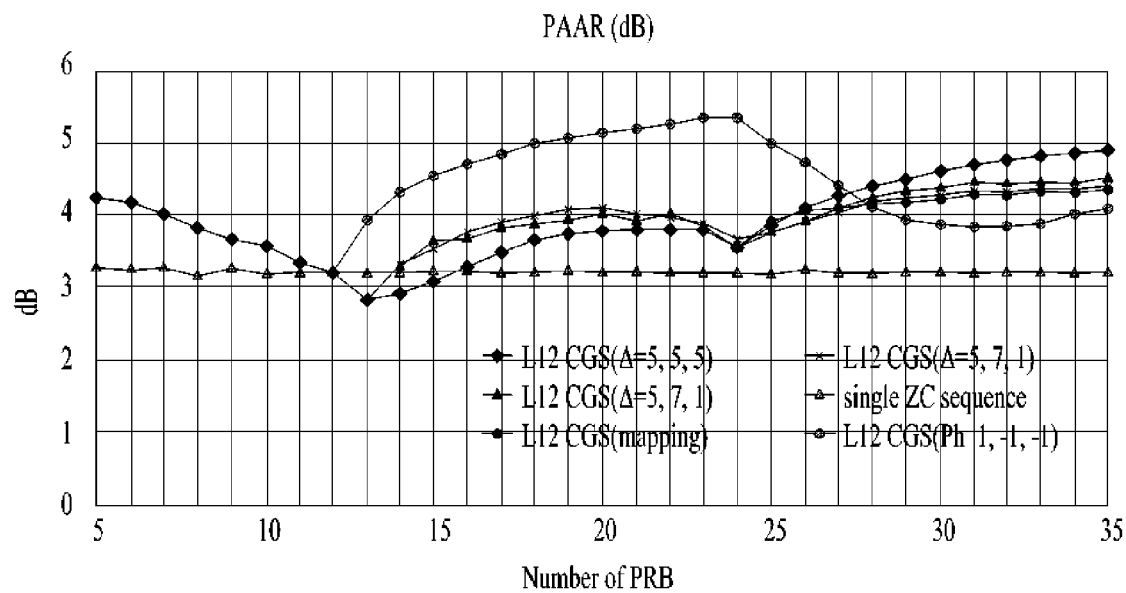
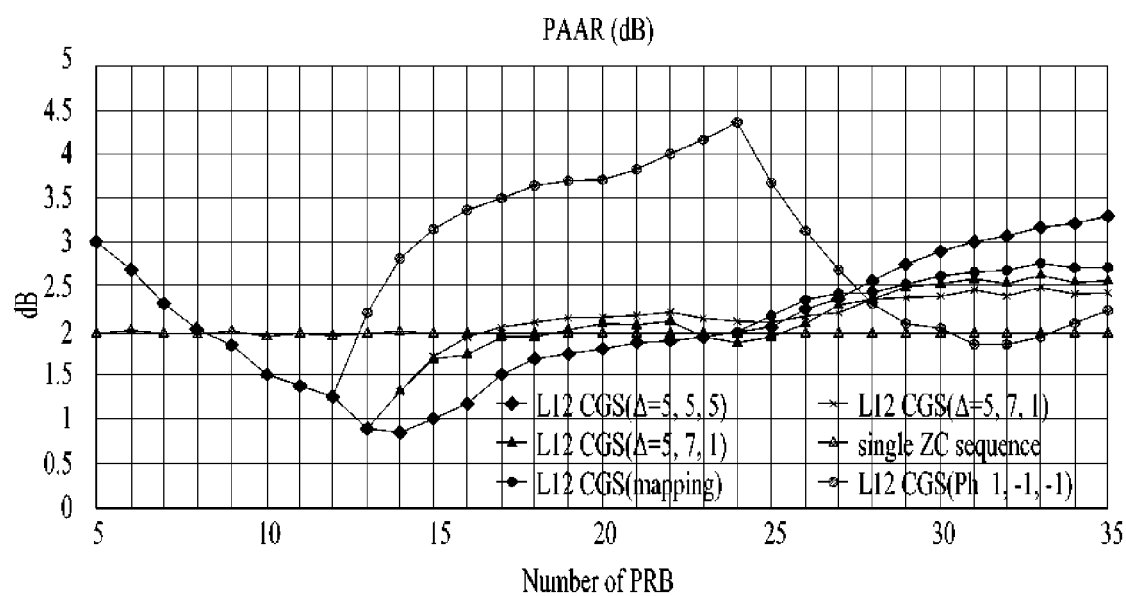

[Fig. 21]
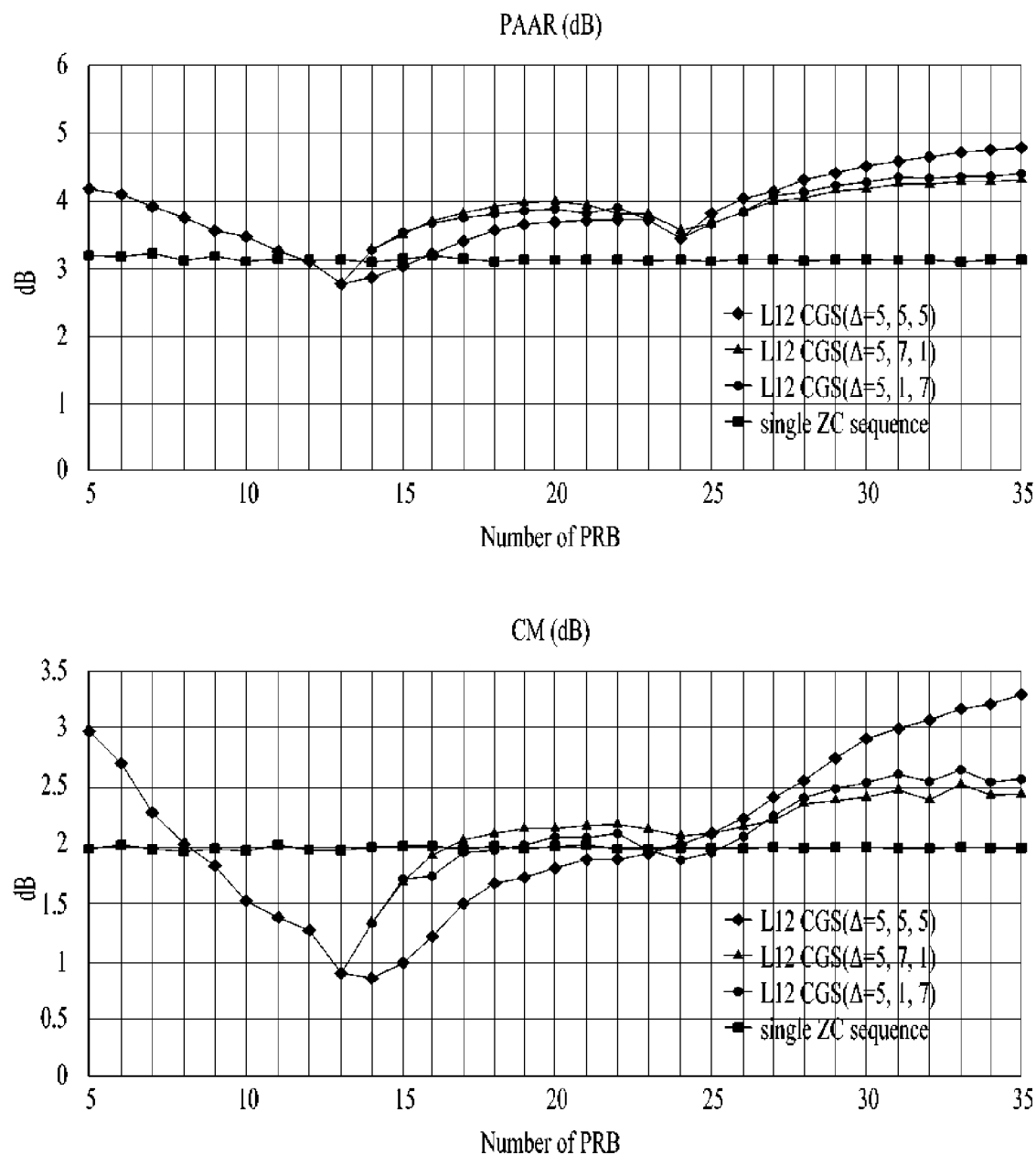

【Fig. 22】
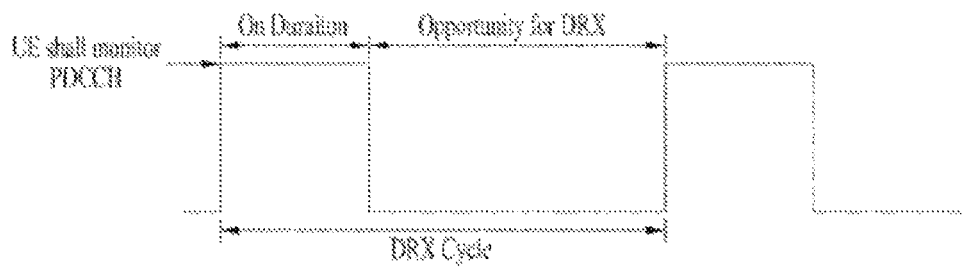
【Fig. 23】
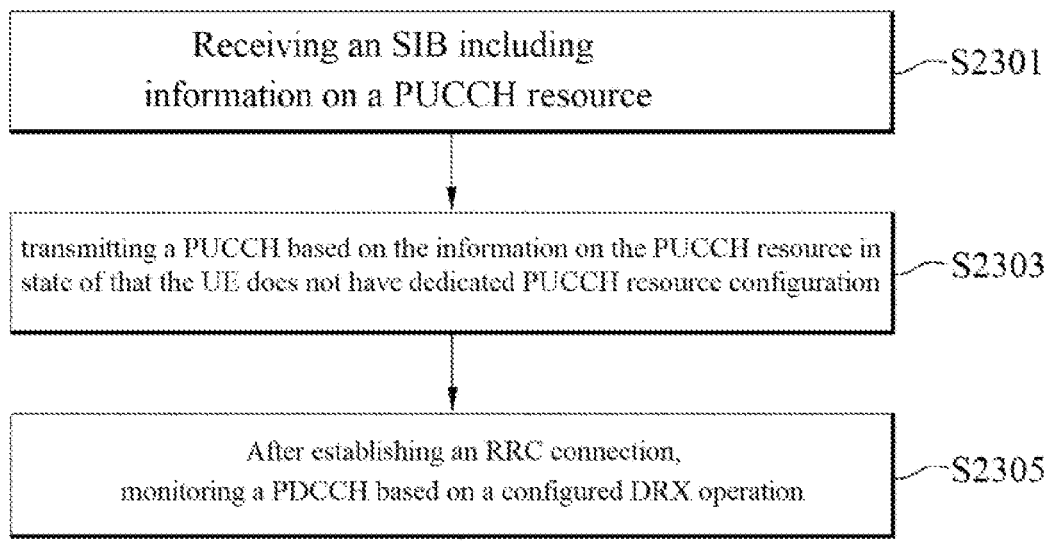

[Fig. 24]
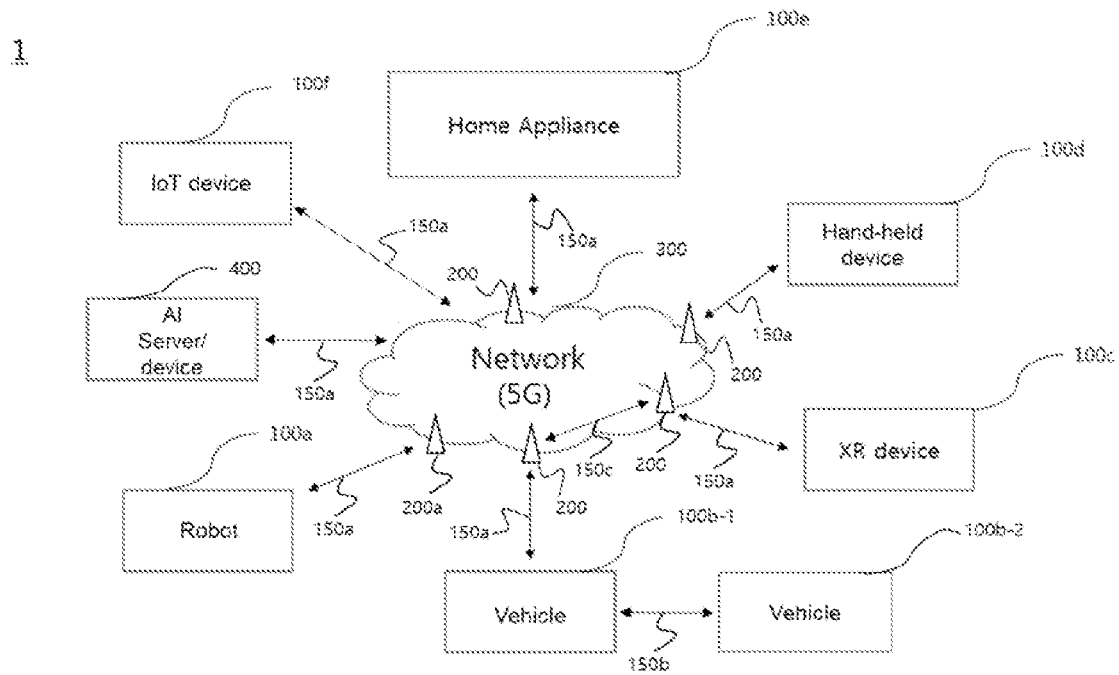
[Fig. 25]
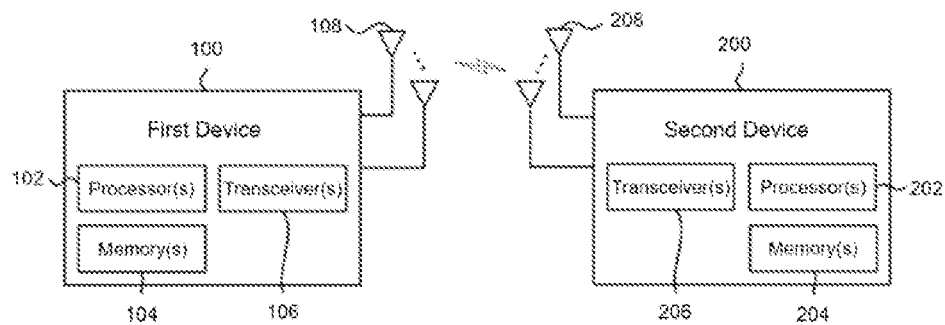

【Fig. 26】
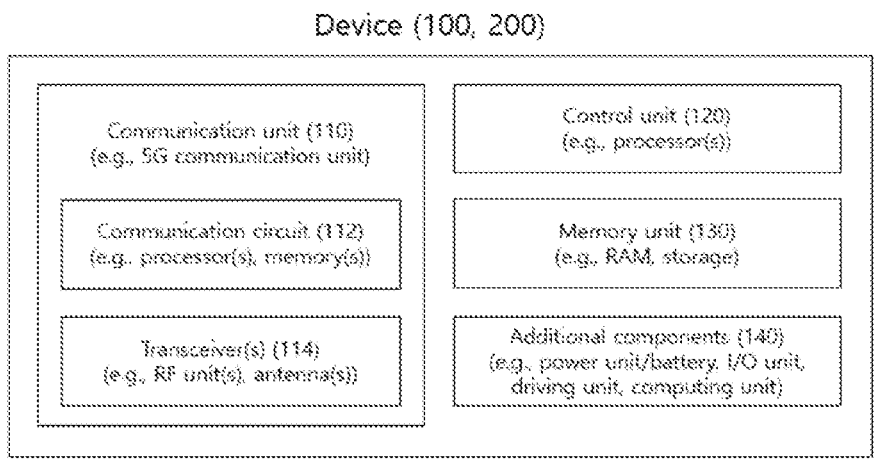
【Fig. 27】
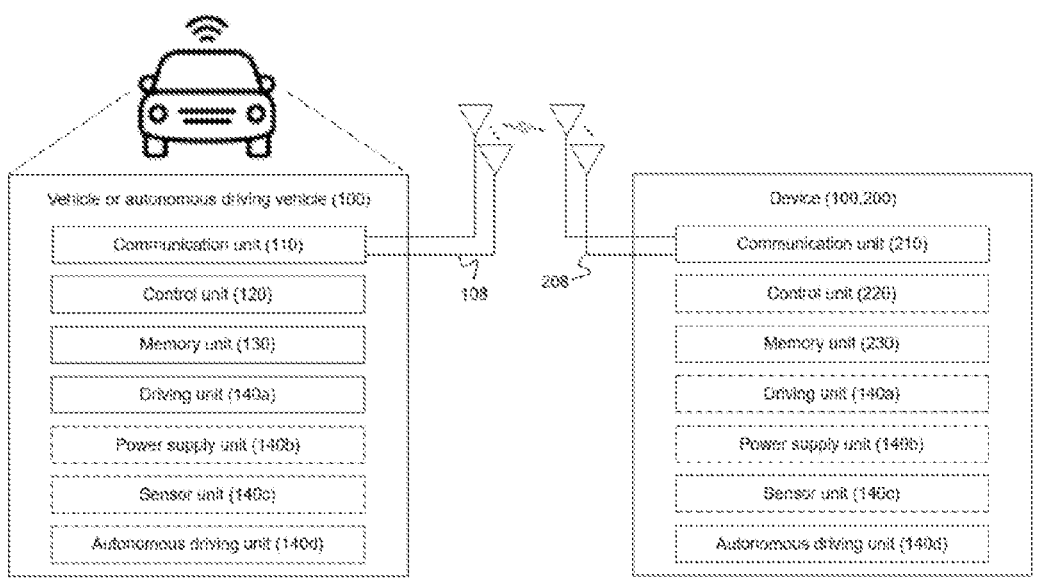

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a continuation of International Application No. PCT/KR2021/014362, filed on Oct. 15, 2021, which claims the benefit of earlier filing date and right of priority to Korean Application Nos. 10-2020-0133156, filed on Oct. 15, 2020, 10-2021-0005568, filed on Jan. 14, 2021, and 10-2021-0048432, filed on Apr. 14, 2021, the contents of which are all hereby incorporated by reference herein in their entireties.

TECHNICAL FIELD

The present disclosure relates to a method and apparatus for use in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In one aspect of the present disclosure, provided herein is a method for transmitting and receiving a signal by a terminal in a wireless communication system. The method may include receiving a System Information Block (SIB) including information on a Physical Uplink Control Channel (PUCCH) resource, transmitting a PUCCH based on information on the PUCCH resource while the terminal does not have a dedicated PUCCH resource configuration, and after establishing a radio resource control (RRC) connection, monitoring a physical downlink control channel (PDCCH) based on a configured discontinuous reception (DRX) operation, wherein the information on the PUCCH resource may include information on the number of Physical Resource Blocks (PRBs) of the PUCCH resource.

In another aspect of the present disclosure, provided herein are a device, a processor, and a storage medium for performing the signal transmission/reception methods.

In the methods and devices, the PUCCH may be generated based on one PUCCH sequence of a length corresponding to the number of PRBs.

In the methods and devices, the PUCCH may be one of PUCCH formats 0 and 1.

In the methods and devices, invalid PUCCH resources among the sixteen PUCCH resources may not be allocated.

In the methods and devices, validity of the PUCCH resource may be determined based on: (i) the number of PRBs in the PUCCH resource; (ii) a total number of RBs in a bandwidth; and (iii) a set of initial cyclic shift (CS) indexes corresponding to the PUCCH resource set.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 1 illustrates a radio frame structure.
FIG. 2 illustrates a resource grid during the duration of a slot.
FIG. 3 illustrates a self-contained slot structure.
FIG. 4 illustrates an acknowledgment/negative acknowledgment (ACK/NACK) transmission process.
FIG. 5 illustrates a wireless communication system supporting an unlicensed band.
FIG. 6 illustrates an exemplary method of occupying resources in an unlicensed band.
FIGS. 7 and 8 are flowcharts illustrating channel access procedures (CAPs) for signal transmission in an unlicensed band.
FIG. 9 illustrates a resource block (RB) interlace.
FIGS. 10 to 23 are a diagram illustrating uplink (UL) channel transmission according to the embodiments of the present disclosure.
FIGS. 24 to 27 illustrate devices according to an embodiment of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2^u) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

NR may support various numerologies (or subcarrier spacings (SCSs)) to provide various 5G services. For example, NR may support a wide area in conventional cellular bands for an SCS of 15 kHz and support a dense urban area and a wide carrier bandwidth with lower latency for an SCS of 30 or 60 kHz. For an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table A6 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 KHz |
| FR2 | 24250 MHz-52600 MHz | 60, 120, 240 KHz |

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)

Supportable UCI payload size: up to K bits (e.g., K=2)

Number of OFDM symbols included in one PUCCH: 1 to X symbols (e.g., X=2)

Transmission structure: only a UCI signal is configured with no DM-RS, and a UCI state is transmitted by selecting and transmitting one of a plurality of sequences.

(1) PUCCH Format 1 (PF1)

Supportable UCI payload size: up to K bits (e.g., K=2)

Number of OFDM symbols included in one PUCCH: Y to Z symbols (e.g., Y=4 and Z=14)

Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)

Supportable UCI payload size: more than K bits (e.g., K=2)

Number of OFDM symbols included in one PUCCH: 1 to X symbols (e.g., X=2)

Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. The DFT is applied to encoded UCI bits with no multiplexing between UEs.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

FIG. 5 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}$=9 us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-band

The BS may perform one of the following U-band access procedures (e.g., CAPs) for DL signal transmission in a U-band.

(1) Type 1 DL CAP Method

In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps:

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration $T_d$ or all the slots of the additional defer duration Ta are detected to be idle.

Step 6) (S1270) If the channel is sensed to be idle for all the slot durations of the additional defer duration $T_d$ (Y), step 4 proceeds. Otherwise (N), step 5 proceeds.

Table 8 shows that $m_p$, a minimum contention window (CW), a maximum CW, a maximum channel occupancy time (MCOT), and an allowed CW size, which are applied to the CAP, vary depending on channel access priority classes.

TABLE 8

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f=16$ us. $T_f$ includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=NERO, where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration $T_d$ or all the slots of the additional defer duration $T_d$ are detected to be idle.

Step 6) (S1570) If the channel is sensed to be idle for all the slot durations of the additional defer duration $T_d$ (Y), step 4 proceeds. Otherwise (N), step 5 proceeds.

Table 9 shows that $m_p$, a minimum CW, a maximum CW, an MCOT, and an allowed CW size, which are applied to the CAP, vary depending on channel access priority classes.

TABLE 9

| Channel Access Priority Class (p) | $m_p$ | $CW_{min,p}$ | $CW_{max,p}$ | $T_{ubcot,p}$ | allowed $CW_p$ sizes |
| --- | --- | --- | --- | --- | --- |
| 1 | 2 | 3 | 7 | 2 ms | {3, 7} |
| 2 | 2 | 7 | 15 | 2 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p} <= CW_p <= CW_{max,p}$. $CW_p$ may be initially configured by $CW_p = CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}=25$ us. Here, $T_{short\_dl}$ includes the duration $T_f$ (=16 us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f=16$ us. In the Type 2B UL CAP, $T_f$ includes a sensing slot within 9 us from the end of the duration. In the Type 2C UL CAP, the UE does not perform channel sensing before performing transmission.

RB Interlace

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M represents the number of interlaces. A transmitter (e.g., UE) may use one or more interlaces to transmit a signal/channel. The signal/channel may include a PUCCH or PUSCH.

3. PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, the methods to be described later are related to uplink transmission and may be equally applied to the uplink signal transmission method in the above-described U-band system (unlicensed band). It should also be noted that embodiments of the present disclosure can be modified or replaced to fit the terms, expressions, structures, etc. defined in each system such that the technical idea proposed in the present disclosure can be implemented in the corresponding system.

For example, uplink transmission using methods related to PUCCH transmission, which will be described later, may be performed in an L-cell and/or a U-cell defined in the U-band system.

As described above, in the Wi-Fi standard (802.11ac), the CCA threshold is defined as −62 dBm for the non-Wi-Fi signal and −82 dBm for the Wi-Fi signal. In other words, when a station (STA) or an access point (AP) of the Wi-Fi system receives a signal from a device not belonging to the Wi-Fi system at the power of −62 dBm or more in a specific band, it skips signal transmission in the specific band.

In the present disclosure, the term "unlicensed band" may be replaced or interchangeably used with "shared spectrum."

The NR frequency band is defined as two types of frequency ranges, FR1 and FR2. FR1 and FR2 may be configured as shown in Table 7 below. FR2 may represent a millimeter wave (mmW).

TABLE 7

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 kHz |

A band (e.g., the 52.6 GHz to 114.25 GHz bands, particularly 71 GHz) higher than the above-mentioned frequency is referred to as FR4. The FR4 region may also be used as an unlicensed band.

When a specific device (and/or node) transmits a signal in the shared spectrum, there may be restrictions in terms of power spectral density (PSD). For example, signal transmission in a partial band of FR4 may be required to satisfy the PSD of 23 dBm/1 MHz. In addition, signal transmission in another partial band may be required to satisfy the PSD of 13 dBm/1 MHz. To this end, the UE may increase the allowable power by spreading the signal along the frequency axis.

In addition, as a regulation on the shared spectrum, there may be restrictions in terms of occupied channel bandwidth (OCB). For example, when a specific device transmits a signal, the signal may need to occupy 70% of the system bandwidth. When the system bandwidth is 400 MHz, the device to transmit a signal may need to occupy 280 MHz or more, which is 70% of 400 MHz.

As the structure of the PUCCH in consideration of regulations related to the PSD and OCB, the above-described RB interlace structure may be used.

Table 8 shows the total number of PRBs based on the SCS and bandwidth in the FR2 region.

TABLE 8

| SCS (kHz) | 50 MHz $N_{RB}$ | 100 MHZ $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

Table 9 shows the expected total number of PRBs when based on Table 8, when the SCS is 240 kHz, 480 kHz, and 960 kHz, and the bandwidth is 800 MHz, 1600 MHz, and 2000 MHz.

TABLE 9

| SCS (kHz) | 50 MHZ $N_{RB}$ | 100 MHz $N_{RB}$ | 200 MHz $N_{RB}$ | 400 MHz $N_{RB}$ | 800 MHZ $N_{RB}$ | 1600 MHz $N_{RB}$ | 2000 MHz $N_{RB}$ |
|---|---|---|---|---|---|---|---|
| 60 | 66 | 132 | 264 | N.A | N.A | N.A | N.A |
| 120 | 32 | 66 | 132 | 264 | N.A | N.A | N.A |
| 240 | 16 | 32 | 66 | 132 | 264 | N.A | N.A |
| 480 | 8 | 16 | 32 | 66 | 132 | 264 | N.A |
| 960 | 4 | 8 | 16 | 32 | 66 | 132 | 160 |

Table 10 shows the number of PRBs for deriving the simulation results of the present disclosure.

TABLE 10

| SCS (kHz) | 50 MHZ $N_{RB}$ | 100 MHZ $N_{RB}$ | 200 MHz $N_{RB}$ | 400 MHz $N_{RB}$ | 800 MHZ $N_{RB}$ | 1600 MHZ $N_{RB}$ | 2000 MHZ $N_{RB}$ |
|---|---|---|---|---|---|---|---|
| 120 | 32 | 64 | 128 | 256 | N.A | N.A | N.A |
| 240 | 16 | 32 | 64 | 128 | 256 | N.A | N.A |
| 480 | 8 | 16 | 32 | 64 | 128 | 256 | N.A |
| 960 | 4 | 8 | 16 | 32 | 64 | 128 | 160 |

When the number of PRBs for each SCS and bandwidth is defined as shown in Table 9 and/or Table 10, it may be difficult to reuse the PUCCH format of the conventional communication system. Accordingly, in the present disclosure, an enhanced PUCCH format for FR4 and content for an enhanced initial PUCCH resource set are proposed.

The number of PRBs for each SCS and bandwidth employed in the system may be different from those in Table 9 and/or Table 10. The proposed methods of the present disclosure may be extended and applied to a system based on the number of PRBs different from those in Table 9 and/or Table 10.

Hereinafter, an operation of a UE for performing PUCCH transmission proposed in the present disclosure will be described.

(1) First, a UE receives configuration information for PUCCH transmission from a BS. Here, the configuration information may include information about a PUCCH format and a PUCCH resource for each SCS, which are proposed in the present disclosure. (2) Next, the UE determines a resource through which the PUCCH will be transmitted, based on the configuration information. (3) Next, the UE performs uplink transmission to the BS on the determined PUCCH resource.

For more details, reference will be made to methods to be described later. That is, the methods to be described later may be combined with the procedures of (1) to (3) to achieve the object/effect proposed in the present disclosure.

3.1. Enhanced PUCCH Format Design for Above 52.6 GHz

In the FR4 region (e.g., above 52.6 GHz band), not only the PSD and OCB described above, but also the maximum power that one node can transmit is limited. As an example, one node may use up to 40 dBm of power. Therefore, considering the PSD regulation and the maximum power limit, the maximum power that may be transmitted in 1 PRB according to each SCS may be determined. While the maximum power in each PRB is transmitted according to each SCS, the maximum number of PRBs not exceeding the maximum transmission power may be calculated as shown in Tables 11, 12 and 13. Table 11 shows a case where the PSD regulation is 23 dBm/1 MHz. Table 12 shows a case where the PSD regulation is 13 dBm/1 MHz.

TABLE 11

| SCS (kHz) | 1 PRB BW (MHz) | 1 PRB TX power (dBm) | # of PRBs | Total Tx power (dBm) |
|---|---|---|---|---|
| 120 | 1.44 | 24.58 | 34 | 39.89 |
|  |  |  | 35 | 40.02 → 40 |
| 240 | 2.88 | 27.59 | 17 | 39.89 |
|  |  |  | 18 | 40.14 → 40 |
| 480 | 5.76 | 30.60 | 8 | 39.63 |
|  |  |  | 9 | 40.14 → 40 |
| 960 | 11.52 | 33.61 | 4 | 39.63 |
|  |  |  | 5 | 40.60 → 40 |

TABLE 12

| SCS (kHz) | 1 PRB BW (MHz) | 1 PRB TX power (dBm) | # of PRBs | Total Tx power (dBm) |
|---|---|---|---|---|
| 120 | 1.44 | 14.58 | 264 | 38.80 |
| 240 | 2.88 | 17.59 | 174 | 39.99 |
|  |  |  | 175 | 40.02 → 40 |
| 480 | 5.76 | 20.60 | 87 | 39.99 |
|  |  |  | 88 | 40.04 → 40 |
| 960 | 11.52 | 23.61 | 43 | 39.95 |
|  |  |  | 44 | 40.04 → 40 |

Table 13 shows a case where the PSD regulation is 38 dBm/1 MHz and the maximum power limit is 55 dBm per node.

TABLE 13

| SCS (kHz) | 1 PRB BW (MHz) | 1 PRB TX power (dBm) | # of PRBs | Total Tx power (dBm) |
|---|---|---|---|---|
| 120 | 1.44 | 39.58 | 34 | 54.89 |
|  |  |  | 35 | 55.02 → 55 |
| 240 | 2.88 | 42.59 | 17 | 54.89 |
|  |  |  | 18 | 55.14 → 55 |
| 480 | 5.76 | 45.60 | 8 | 54.63 |
|  |  |  | 9 | 55.14 → 55 |
| 960 | 11.52 | 48.61 | 4 | 54.63 |
|  |  |  | 5 | 55.60 → 55 |

Specifically, in Tables 11 and 13, #of PRBs is obtained identically. The examples in Tables 11 to 13 were derived based on the requirements in the European region. Even when a different number of PRBs derived from the requirements in other regions is obtained, the proposed methods of the present disclosure may be used.

As shown in Tables 11 to 13, the minimum number of PRBs per SCS may be calculated, taking into account the PSD requirement and maximum power limit. The BS should allocate resources more than the number of PRBs calculated in Tables 11 to 13 to allow the UE to use the maximum power in transmitting the PUCCH. Therefore, the following methods may be proposed. The number of PRBs proposed below basically means the number of contiguous PRBs in transmitting PUCCH format 0/1/2/3/4, but may be extended to an interlaced PRB form.

[Method 3-1-1] Setting the minimum number of PRBs that satisfy effective isotropic radiated power (EIRP) for PUCCH format 0/1

In Method 1, the minimum number of PRBs calculated in consideration of the PSD requirement and maximum power limit is set as the minimum number of PRBs for PUCCH transmission. As an example, the minimum number of PRBs for each SCS may be given as shown in Table 14 (based on the European Band 75 (cl) requirement).

TABLE 14

| SCS (kHz) | Minimum # of PRBs |
|---|---|
| 120 | 35 |
| 240 | 18 |
| 480 | 9 |
| 960 | 5 |

As a method to configure and/or set PUCCH format 0 and/or 1 that satisfies the PRB numbers in Table 14, the sequence used for PUCCH format 0 and/or 1 may be configured as a long sequence corresponding to the minimum number of PRBs calculated in consideration of the PSD requirement and maximum power limit.

As an example, when the number of PRBs calculated in consideration of the PSD requirement and the maximum power limit for each SCS is determined as shown in Table 14, a sequence length that may be used for PUCCH formats 0 and/or 1 may be proposed as shown in Table 15. Each sequence length is determined as the greatest prime number among the numbers smaller than the number of REs used for uplink transmission. Specifically, in the conventional communication system, a sequence based on a computer generated sequence (CGS) is used when the sequence length is less than or equal to 36, and a Zadoff-Chu (ZC) sequence is used when the sequence length is greater than or equal to 36. When the number of PRBs is determined as shown in Table 14, all sequence lengths are greater than or equal to 36, and therefore a sequence to be used may be a ZC sequence.

TABLE 15

| SCS (kHz) | Minimum # of PRBs | # of REs | Sequence length (ZC) |
|---|---|---|---|
| 120 | 35 | 420 | 419 |
| 240 | 18 | 216 | 211 |
| 480 | 9 | 108 | 107 |
| 960 | 5 | 60 | 59 |

[Method 3-1-1-A]: Indicating the number of PRBs for PUCCH format 0/1 by the BS

In Method 1, the minimum number of PRBs for PUCCH formats 0 and/or 1 is calculated and predetermined in consideration of the PSD requirement and maximum power limit. In addition, the BS may indicate the number of PRBs for transmitting PUCCH format 0/1 to the UE through higher layer signaling (e.g., SIB). In the present disclosure, transmitting a PUCCH format may mean transmitting the PUCCH for which the corresponding format is configured.

The BS may efficiently divide the frequency domain resources in consideration of the SCS value and/or the size of the nominal BW (or carrier or BWP), and indicate the number of PRBs such that PUCCH formats 0 and/or 1 transmitted by a plurality of UEs may be multiplexed.

For example, as shown in Table 16, the number of PRBs for PUCCH formats 0 and/or 1 may be allocated in the form of powers of 2, such as 4, 8, 16, 32, for each of SCSs 120, 240, 480, and 960 kHz. The BS may indicate the number of PRBs to the UE through higher layer signaling. When the number of PRBs indicated by the BS is smaller than the required number of PRBs, the UE may transmit PUCCH formats 0 and/or 1 according to the PSD requirement instead of transmitting the maximum power, considering the PSD requirement and the maximum power limit.

TABLE 16

| SCS (kHz) | Minimum # of PRBs |
| --- | --- |
| 120 | 32 |
| 240 | 16 |
| 480 | 8 |
| 960 | 4 |

When the BS indicates the number of PRBs for PUCCH format 0 and/or 1 in consideration of FDM capacity, the number of PRBs should be set so as not to be below a specific range with respect to the number of PRBs determined based on PSD requirement and maximum power limit. An excessively small number of PRBs may reduce the transmission power of the UE, thereby causing a problem in terms of link budget.

[Method 3-1-2] Repeatedly transmitting the existing PUCCH format 0/1 as many times as PRBs corresponding to the smallest prime number that is greater than or equal to the minimum number of PRBs satisfying the EIRP Existing NR PUCCH formats 0 and/or 1 are transmitted as much as a single PRB. Therefore, as shown in Table 14, when the minimum number of PRBs calculated in consideration of the PSD requirement and the maximum power limit is defined, the corresponding single PRB may be repeated in the frequency domain. In the present disclosure, repetition of a PRB may be interpreted as repetition of a PUCCH sequence included in the PRB. The number of repeated PRBs may be determined as the smallest prime number among the numbers greater than or equal to the defined minimum number of PRBs. Existing NR PUCCH formats 0 and/or 1 may be transmitted based on the determined number of repeated PRBs. The number of repeated PRBs selected in Table 14 is shown in Table 17.

TABLE 17

| SCS (kHz) | Minimum # of PRBs | Prime number |
| --- | --- | --- |
| 120 | 35 | 37 |
| 240 | 18 | 19 |
| 480 | 9 | 11 |
| 960 | 5 | 5 |

Since the repeated sequence may deteriorate the peak-to-average power ratio (PAPR)/cubic metric (CM) performance, a phase shift pattern having $\pi/4$ step may be applied to achieve low PAPR/CM performance. As an example, in the case of 480 kHz SCS, when NR-PUCCH formats 0 and/or 1 are repeatedly transmitted by 11 PRBs in the frequency domain, one of the top four phase shift patterns in FIG. 10 may be used. In this case, the reason for using one of the top four phase shift patterns is that the phase shift pattern used has superior PAPR/CM performance than the other phase shift patterns. Here, the phase shift may occur by $\{0, \pi/4, 2\pi/4, 3\pi/4\}$ in order of $\{1, 0+1i, -1, 0-1i\}$, and each pattern may be applied and/or configured in a PRB level. For example, when the uppermost pattern among the patterns of FIG. 10 is used, sequences of the first to third PRBs (in ascending or descending order in the frequency domain) among the 11 PRBs are not phase shifted, and the sequences of the fourth to sixth PRBs are phase shifted by $2\pi/4$.

When a phase shift pattern having a step of $\pi/4$ is applied, the number of PRBs is suggested as a prime number for the reason shown in FIG. 11. It may be seen from FIG. 10 that better PAPR/CM performance is obtained when the number of sequences repeatedly transmitted in the PRB level is set to a prime number than when the number is set to a number that is not a prime number.

[Method 3-1-3] Defining the minimum number of PRBs for PUCCH transmission for PUCCH format 2/3

PUCCH formats 2 and 3 are formats in which PUCCH transmission through multiple PRBs is supported. Accordingly, compared to the conventional communication system, the BS may configure and/or indicate transmission of PUCCH formats 2 and/or 3 using more than the minimum PRB calculated in consideration of the PSD requirement and the maximum power limit without additional definition.

In the case of PUCCH formats 2 and/or 3, even if the BS indicates a PUCCH resource, the UE may not fully use the indicated PUCCH resource. Specifically, the UE may perform transmission transmit by reducing the number of PRBs in accordance with the coding rate for transmission of PUCCH format 2 and/or 3 within the PUCCH resource indicated by the BS.

In the FR4 band, reliability may be secured only when the PUCCH is transmitted using at least the minimum number of PRBs calculated in consideration of the PSD requirement and the maximum power limit as mentioned above. When the UE is to transmit PUCCH format 2 and/or 3 by reducing the number of PRBs for PUCCH format 2 and/or 3 according to the coding rate, the number of PRBs may be configured not to be smaller than the minimum number of PRBs calculated in consideration of the PSD requirement and maximum power limit. For example, when the minimum number of PRBs is defined as shown in Table 14, the UE may reduce the number of PRBs based on the coding rate up to the minimum number of PRBs listed in Table 14.

Additionally, the minimum number of PRBs calculated in consideration of the PSD requirement and maximum power limit may depend on regional regulations and the like. In consideration of this feature, the BS may indicate the minimum number of PRBs through higher layer signaling (e.g., SIB or (dedicated) RRC signaling). When the UE is to perform transmission by reducing the number of PRBs for PUCCH formats 2 and/or 3 according to the coding rate, the number of PRBs may not be reduced below the minimum number of PRBs indicated by the BS. In this case, it may be preferable in terms of reliability of the UE to set the number of PRBs that the BS may indicate to be greater than or equal to the minimum number of PRBs calculated in consideration of the PSD requirement and the maximum power limit.

In addition, the maximum number of PRBs that may be allocated to NR PUCCH formats 2 and/or 3 needs to be redefined. Currently, the minimum number of PRBs that may be allocated to NR PUCCH formats 2 and 3 is defined as 16. However, when the minimum number of PRBs as shown in Table 14 is defined as an example, the maximum number of RBs that may be allocated to PUCCH formats 2 and/or 3 needs to be set to be greater than or equal to the minimum number of PRBs. The maximum number of PRBs may also depend on regional regulations. In consideration of this feature, the BS may indicate the maximum number of PRBs through higher layer signaling (e.g., SIB or (dedicated) RRC signaling). The BS may indicate to the UE the maximum number of PRBs, and may also indicate to the UE the number of PRBs less than or equal to the maximum number of PRBs. The UE may use the acquired number of PRBs for transmission of PUCCH format 2 and/or 3.

[Method 3-1-4] Setting the number of PRBs for PUCCH format 4 and increasing the (maximum) OCC length of pre-DFT OCC as the number of PRBs increases NR PUCCH format 4 is a PUCCH format capable of UE multiplexing with pre-DFT OCC while using a single PRB. In this regard, the DFT operation is used, and therefore the number of PRBs for PUCCH format 4 should always be set to satisfy a multiple of 2, 3 or 5 (i.e., DFT constraint: a number that may be expressed in the form of 2a*3b*5c, where a, b, and c are positive integer including 0). Therefore, given the minimum PRB value calculated in consideration of the PSD requirement and the maximum power limit in the FR4 region, the number of PRBs for PUCCH format 4 may be set to one of the following options, further considering even the DFT constraint.

Option 3-1-4-1) Minimum number of PRBs that satisfy the DFT constraint while achieving the maximum TX power To set the number as in Option 3-1-4-1, the number of PRBs should be set to a value greater than or equal to the minimum number of PRBs calculated in consideration of the PSD requirement and the maximum power limit. Therefore, the smallest number of PRBs may be selected from among the numbers of PRBs that are greater than or equal to the minimum number of PRBs and satisfy the DFT constraint.

For example, when the minimum number of PRBs is defined as shown in Table 14, the minimum number of PRBs that is greater than or equal to the defined minimum number of PRBs and satisfy the DFT constraint is shown in Table 18.

TABLE 18

| SCS (kHz) | Minimum # of PRBs | With DFT constraint |
|---|---|---|
| 120 | 35 | $36 = 2^2*3^2*5^0$ |
| 240 | 18 | $18 = 2^1 \times 3^2 \times 5^0$ |
| 480 | 9 | $9 = 2^0 \times 3^2 \times 5^0$ |
| 960 | 5 | $5 = 2^0 \times 3^0 \times 5^1$ |

Option 3-1-4-2) Maximum number of PRBs that satisfy the DFT constraint while approaching the maximum TX power To set a number as in option 3-1-4-2, the largest number may be selected from among the numbers of PRBs that are less than or equal to the minimum number of PRBs calculated in consideration of the PSD requirement and the maximum power limit and satisfy the DFT constraint.

For example, when the minimum number of PRBs is defined as shown in Table 14, the maximum number of PRBs that are less than or equal to the defined minimum number of PRBs and satisfy the DFT constraint may be represented as shown in Table 19.

TABLE 19

| SCS (kHz) | Minimum # of PRBs | With DFT constraint |
|---|---|---|
| 120 | 35 | $32 = 2^5*3^0*5^0$ |
| 240 | 18 | $18 = 2^1*3^2*5^0$ |
| 480 | 9 | $9 = 2^0*3^2*5^0$ |
| 960 | 5 | $5 = 2^0*3^0*5^1$ |

According to option 3-1-4-2, the number of PRBs required is reduced (e.g., in the case of 120 kHz) compared to option 3-1-4-1. Accordingly, option 3-1-4-2 is advantageous in terms of frequency multiplexing with other signals and/or channels. However, in option 3-1-4-2, when the UE transmits PUCCH format 4, the maximum transmit power may not be achieved (e.g., in the case of 120 kHz). Accordingly, option 3-1-4-1 may be advantageous in terms of reliability.

Next, since the number of PRBs is increased in the FR4 region, the length of the pre-DFT OCC may be increased. When the pre-DFT OCC is increased, the UE multiplexing capacity may be increased. The pre-DFT OCC length of PUCCH format 4 in the current NR is length=2 when a maximum of two UEs are multiplexed, and length=4 when a maximum of four UEs are multiplexed.

When the number of PRBs is defined as shown in Table 18 or Table 19, if the number of REs corresponding to the number of PRBs is divided by a power of 2, the power of 2 may be the OCC length and the maximum number of multiplexed UEs. As an example, in the case of 120 kHz SCS of Table 18, there are 36*12=432 REs for a resource for PUCCH format 4. Also, since 432=16*27, a maximum of 16 UEs may be multiplexed. In this case, the OCC length may be 16. When the actual pre-DFT is performed, length-16 OCC may be applied to in a bundle of 27 RE, and thus a total sequence of length 432 may be configured. Thereby, 4 times the UE multiplexing capacity in the existing NR PUCCH format 4 may be secured.

If increasing the multiplexing capacity is a major issue, as shown in Table 20, the largest number of the PRBs among the powers of 2 that is less than or equal to the minimum number of PRBs satisfying the PSD requirement and the maximum power limit may be determined as the number of PRBs for PUCCH format 4 (satisfying the DFT constraint as a power of 2).

TABLE 20

| SCS (kHz) | Minimum # of PRBs | Power of 2 |
|---|---|---|
| 120 | 35 | $32 = 2^5 \times 3^0 \times 5^0$ |
| 240 | 18 | $16 = 2^4 \times 3^0 \times 5^0$ |
| 480 | 9 | $8 = 2^3 \times 3^0 \times 5^0$ |
| 960 | 5 | $4 = 2^2 \times 3^0 \times 5^0$ |

When configuration is established as shown in Table 20, multiplexing of 16 UEs (pre-DFT OCC length=16) may be supported in all SCSs. In the 120 kHz SCS, multiplexing of up to 128 UEs (pre-DFT OCC length=128) may be supported.

PRB Configurability of Enhanced PUCCH Format

As mentioned above, multiple PRBs, not one PRB, may be defined as being used for transmission of PUCCH format 0/1/4 and the like for FR4. Specifically, the multiple PRBs may be defined in the form of PRBs for actual transmission, or a PRB range or minimum PRBs in which that transmission may be actually perfumed. Specifically, they may be configured/indicated using one of the following methods and/or a combination thereof.

1. Number of PRBs for enhanced PUCCH format (e.g., EPF 0/1/4)

A. A fixed number of PRBs for enhanced PUCCH formats (EPFs) may be predefined between the BS and the UE.

A-i. The number of PRBs may be set/indicated as an optimal value in consideration of TX power, independently for each SCS, and as a fixed value.

B. The maximum value of PRBs for EPFs may be predefined between the BS and the UE.

B-i. The BS may set/indicate an appropriate number of PRBs among the values from 1 to the maximum number of PRBs defined above in consideration of the SCS of the PUCCH and the TX power of the UE.

C. The minimum value of PRBs for EPFs may be predefined between the BS and the UE.

C-i. The BS may set/indicate an appropriate number of PRBs in consideration of the SCS of the PUCCH and the TX power of the UE such that the appropriate number is greater than or equal to the minimum PRB defined above.

D. The minimum and maximum PRB values for EPFs may be predefined between the BS and the UE.

D-i. The BS may set/indicate an appropriate number of PRBs in consideration of the SCS of the PUCCH and the TX power of the UE such that the appropriate number is greater than or equal to the minimum PRB defined above and less than or equal to the maximum PRB.

2. The actual number of PRBs to be used in the above-mentioned method may follow the methods proposed in Section 3.1 above.

3. Methods that may configure the number of PRBs among the aforementioned methods 3-A. The BS may indicate the number to the UE at the PRB level.

3-B. The number may be allocated differently for each PUCCH resource.

Setting the starting cyclic shift value when a single ZC sequence is used for PUCCH format 0/1

Among the above methods, when a single ZC sequence is configured for PUCCH format 0 and/or 1, a starting cyclic shift value defined using length-12 CGS needs to be changed. In the conventional system, as shown in Tables 21 to 24 below, a cyclic shift (CS) value for indicating HARQ-ACK and/or positive/negative SR of PF0 when using the length-12 CGS is defined. Table 21 shows mapping of values for one HARQ-ACK information bit to sequences for PUCCH format 0. Table 22 shows mapping of values for two HARQ-ACK information bits to sequences for PUCCH format 0. Table 23 shows mapping of values for one HARQ-ACK information bit and positive SR to sequences for PUCCH format 0. Table 24 shows mapping of values for two HARQ-ACK information bits and positive SR to sequences for PUCCH format 0.

That is, the UE transmits 1-bit HARQ-ACK information and/or positive/negative SR information using CS {0, 6} and CS {3, 9}, and transmits 2-bits HARQ-ACK information and/or positive/negative SR information using CS {0, 3, 6, 9} and CS {1, 4, 7, 10}. In addition, when the UE transmits 1-bit HARQ-ACK and/or positive/negative SR information, CS {1, 7} & CS {4, 10}, and CS {2, 8} & CS {5, 11} may be used for UE multiplexing.

TABLE 21

| HARQ-ACK Value | 0 | 1 |
|---|---|---|
| Sequence cyclic shift | $m_{cs} = 0$ | $m_{cs} = 6$ |

TABLE 22

| HARQ-ACK Value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

TABLE 23

| HARQ-ACK Value | 0 | 1 |
|---|---|---|
| Sequence cyclic shift | $m_{cs} = 3$ | $m_{cs} = 9$ |

TABLE 24

| HARQ-ACK Value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

Additionally, in the case of PF1, CS {0, 1, 2, 3, 4, 5, 6, 7, 8, 9, 10, 11} is used for UE multiplexing.

Accordingly, when a ZC sequence length is newly defined in place of the length-12 CGS, a CS value to replace the existing CS value is required. First, the CS value may be determined based on the total number of REs to be occupied by a ZC sequence length to be newly introduced. Second, the CS value may be determined based on the ZC sequence length to be newly introduced.

1. Determining CS values based on the total number of REs to be occupied by the ZC sequence to be newly introduced 1-A. the total number of REs to be occupied by the ZC sequence length to be newly introduced is defined as K, the interval between the actual CSs may be K/12.

1-A-i. The portion occupied by the normal CP length in the current {OFDM symbol length+normal CP length} is about ¹/₁₂. Accordingly, when the length-12 CGS is used, the interval of the actual CS is set to 12/12=1.

1-A-ii. The CS values of {0, 1, 2, 3, 4, 5, 6, 7, 8, 9, 10, 11} may be replaced with {0, K/12, 2*K/12, 3*K/12, . . . , 11*K/12}.

1-B. For example, when K is 420 REs (the actual ZC sequence is L419-ZC), 420/12=35 may be an interval that the CS has.

1-B-i. CSs {0, 6}, {1, 7}, {2, 8}, {3, 9}, {4, 10}, {5, 11}, {0, 3, 6, 9}, and {1, 4, 7, 10} used in NR PF0 may be replaced with CSs {0, 210}, {35, 245}, {70, 280}, {105, 315}, {140, 350}, {175, 385}, {0, 105, 210, 315}, and {35, 140, 245, 350} for EPF0 of FR4.

1-B-ii. CS {0, 1, 2, 3, 4, 5, 6, 7, 8, 9, 10, 11} used in NR PF1 may be replaced with CS {0, 35, 70, 105, 140, 175, 210, 245, 280, 315, 350, 385} for EPF1 in FR4.

1-C. As another example, when K is 216 REs (the actual ZC sequence is L211-ZC), 216/12=18 may be an interval that the CS has.

1-C-i. CSs {0, 6}, {1, 7}, {2, 8}, {3, 9}, {4, 10}, {5, 11}, {0, 3, 6, 9}, and {1, 4, 7, 10} used in NR PF0 may be replaced with CSs {0, 108}, {18, 126}, {36, 144}, {54, 162}, {72, 180}, {90, 198}, {0, 54, 108, 162}, and {18, 72, 126, 180} for EPF0 of FR4.

1-C-ii. CS {0, 1, 2, 3, 4, 5, 6, 7, 8, 9, 10, 11} used in NR PF1 may be replaced with CS {0, 18, 36, 54, 72, 90, 108, 126, 144, 162, 180, 198} for EPF1 in FR4.

2. Determining CS values based on the length of the ZC sequence to be newly introduced 2-A. When the length of the ZC sequence to be newly introduced is defined as L, the interval that the actual SC has may be $\lceil L/12 \rceil$ or $\lfloor L/12 \rfloor$. The floor function or the ceiling function is used because the ZC sequence is always a prime number, and thus the value obtained by dividing the same by 12 is not an integer.

2-A-i. The portion occupied by the normal CP length in the current {OFDM symbol length+normal CP length} is about 1/12. Accordingly, when the length-12 CGS is used, the interval of the actual CS is set to 12/12=1.

2-A-ii. The CS values of {0, 1, 2, 3, 4, 5, 6, 7, 8, 9, 10, 11} may be replaced with {0, $\lceil L/12 \rceil$, 2*$\lceil L/12 \rceil$, 3*$\lceil L/12 \rceil$, . . . , 11*$\lceil L/12 \rceil$} or {0, $\lfloor L/12 \rfloor$, 2*$\lfloor L/12 \rfloor$, 3*$\lfloor L/12 \rfloor$, . . . , 11*$\lfloor L/12 \rfloor$}. Alternatively, the CS values of {0, 1, 2, 3, 4, 5, 6, 7, 8, 9, 10, 11} may be replaced with {0, $\lceil L/12 \rceil$, 2×$\lceil L/12 \rceil$, 3×$\lceil L/12 \rceil$, . . . , 11×$\lceil L/12 \rceil$} or {0, $\lfloor L/12 \rfloor$, 2×$\lfloor L/12 \rfloor$, 3×$\lfloor L/12 \rfloor$, . . . , 11×$\lfloor L/12 \rfloor$}.

2-A-iii. Alternatively, $\lceil L/12 \rceil$ or $\lfloor L/12 \rfloor$ may be alternately applied.

B. As an example, when L is 419 (the number of actually mapped REs is 420), $\lceil 419/12 \rceil$=35 or $\lfloor 419/12 \rfloor$=34 may be the interval that the CS has.

B-i. When the CS interval is 35, the aforementioned method in item 1-B may be used.

B-ii. When the CS interval is 34, CSs {0, 6}, {1, 7}, {2, 8}, {3, 9}, {4, 10}, {5, 11}, {0, 3, 6, 9}, and {1, 4, 7, 10} used in NR PF0 may be replaced with CSs {0, 204}, {34, 238}, {68, 272}, {102, 306}, {136, 340}, {170, 374}, {0, 102, 204, 306}, and {34, 136, 238, 340} for EPF0 of FR4.

B-iii. When the CS interval is 34, CS {0, 1, 2, 3, 4, 5, 6, 7, 8, 9, 10, 11} used in NR PF1 may be replaced with CS {0, 34, 68, 102, 136, 170, 204, 238, 272, 306, 340, 374} for EPF1 of FR4.

C. As another example, when L is 211 (the number of actually mapped REs is 216), $\lceil 211/12 \rceil$=18 or $\lfloor 211/12 \rfloor$=17 may be the interval that the CS has.

C-i. When the CS interval is 18, the method in item 1-C may be used.

C-ii. When the CS interval is 17, CSs {0, 6}, {1, 7}, {2, 8}, {3, 9}, {4, 10}, {5, 11}, {0, 3, 6, 9}, and {1, 4, 7, 10} used in NR PF0 may be replaced with CSs {0, 102}, {17, 119}, {34, 136}, {51, 153}, {68, 170}, {85, 187}, {0, 51, 102, 153}, and {17, 68, 119, 170} for EPF0 of FR4.

C-iii. Similarly, when the CS interval is 17, CS {0, 1, 2, 3, 4, 5, 6, 7, 8, 9, 10, 11} used in NR PF1 may be replaced with CS {0, 17, 34, 51, 68, 85, 102, 119, 136, 153, 170, 187} for EPF1 in FR4.

3.2. Enhanced initial PUCCH resource set design for above 52.6 GHz

FIG. 12 illustrates a configuration for an initial PUCCH resource set.

In FIG. 12, when the "set of initial CS indexes" has two elements (indexes 0, 3, 7, 11), 8 PRBs are required for PUCCH transmission because PUCCH format 0 and/or 1 is subjected to a single PRB transmission (i.e., one PRB is one FDM resource). Similarly, when the "set of initial CS indexes" has three elements (indexes 1 and 2), 6 PRBs are required for PUCCH transmission. When the "set of initial CS indexes" has four elements (indexes 4, 5, 6, 8, 9, 10, 12, 13, 14, and 15), 4 PRBs are required for PUCCH transmission.

In FR4, as mentioned in Section 3.1 above, the minimum PRB values shown in Table 14 may be defined in consideration of the PSD requirement and the maximum power limit. In order for the defined PRB values to be applied to the initial PUCCH resource set, the number of PRBs corresponding to one FDM resource may be set to the minimum of PRBs shown in Table 14. As mentioned above, when the "set of initial CS indexes" has two elements (indexes 0, 3, 7, and 11) in FIG. 12, 8 FDM resources are required. Configurability of the 8 FDM resources is shown in Table 25 according to each SCS value and/or nominal BW (Carrier/BWP BW) size. Table 25 is based on assumption that Table 14 is determined as the minimum number of PRBs.

TABLE 25

| SCS (kHz) | # of PRBs | x8 | Nominal BW (Carrier/BWP BW) (MHz) | | | | |
|---|---|---|---|---|---|---|---|
| | | | 200 | 400 | 800 | 1600 | 2000 |
| 120 | 35 | 280 | X (>132) | X (>264) | NA | NA | NA |
| 240 | 18 | 144 | X (>66) | X (>132) | O (<264) | NA | NA |
| 480 | 9 | 72 | X (>32) | X (>66) | O (<132) | O (<264) | NA |
| 960 | 5 | 40 | X (>16) | X (>32) | O (<66) | O (<132) | O (<160) |

Referring to Table 25, when the size of the nominal BW (Carrier/BWP BW) is 200 MHz or 400 MHz, 8 FDM resources may not be secured for all SCS values.

As mentioned above, when the "set of initial CS indexes" has three elements (indexes 1 and 2) in FIG. 12, 6 FDM resources are required. Table 25 shows the SCS values and/or the size of the nominal BW (Carrier/BWP BW). Table 26 is based on the assumption that Table 14 is determined as the minimum number of PRBs.

TABLE 26

| SCS (kHz) | # of PRBs | X6 | Nominal BW (Carrier/BWP BW) | | | | |
|---|---|---|---|---|---|---|---|
| | | | 200 | 400 | 800 | 1600 | 2000 |
| 120 | 35 | 210 | X (>132) | O (<264) | NA | NA | NA |
| 240 | 18 | 108 | X (>66) | O (<132) | O (<264) | NA | NA |

TABLE 26-continued

| SCS | | | Nominal BW (Carrier/BWP BW) | | | | |
|---|---|---|---|---|---|---|---|
| (kHz) | # of PRBs | X6 | 200 | 400 | 800 | 1600 | 2000 |
| 480 | 9 | 54 | X (>32) | O (<66) | O (<132) | O (<264) | NA |
| 960 | 5 | 30 | X (>16) | O (<32) | O (<66) | O (<132) | O (<160) |

Referring to Table 26, when the size of the nominal BW (Carrier/BWP BW) is 200 MHz, 6 FDM resources may not be secured for all SCS values.

It may be seen that if the initial PUCCH resource set of the existing NR is used in FR4, FDM resources may not be secured. Accordingly, in Section 3.2, methods for configuring an initial PUCCH resource set in FR4 are proposed.

When initial PUCCH formats 0 and/or 1 are transmitted in the form of multiple PRBs in Section 3.2, the methods (e.g., Method 1 and/or Method 2) proposed in Section 3.1 may be combined.

[Method 3-2-1]: Configuring non-overlapping PUCCH resources in the frequency domain to be valid, starting with the lowest PUCCH resource The first row of FIG. 13 shows initial CS index values, When the PUCCH resource set with index 0 in FIG. 12 is configured, CS index values may be 0 and 3 as shown in FIG. 13. When a PUCCH resource set of another index in FIG. 12 is configured, a different initial CS index value may be given. The remaining part of FIG. 13 shows values of 16 PUCCH resources ($r_{PUCCH}$) included in one PUCCH resource set. The 16 resources $r_{PUCCH}$ may be arranged as shown in FIG. 13.

Referring to FIG. 13, when 8 FDM resources are required (namely, when the "set of initial CS indexes" has two elements), PUCCH resources 0 to 7 are configured starting with a lower frequency PRB, and PUCCH resources 8 to 15 are configured starting with a higher frequency PRB, within the initial UL BWP. When frequency hopping is configured, PUCCH resources 0 to 7 are configured starting with a higher frequency PRB, and PUCCH resources 8 to 15 are configured starting with a lower frequency PRB, within the initial UL BWP.

Method 1 is to configure only non-overlapping PUCCH resources in the frequency domain to be valid, starting with the lowest PUCCH resource. As an example, based on Table 25, when 120 kHz SCS is used and the 200 MHz nominal BW (Carrier/BWP BW) is applied, the maximum possible number of FDM resources is up to three sets of 35 PRBs (132/35=3.77). Therefore, when the "set of initial CS indexes" of FIG. 12 has two elements (indexes 0, 3, 7, 11 in FIG. 12), up to 6 PUCCH resources are valid in one PUCCH resource set, considering that there are three sets of PRBs in the frequency domain, and two CS values are available. Accordingly, in one PUCCH resource set, a total of six PUCCH resources with $r_{PUCCH}$ ranging from 0 to 5 may be configured as valid PUCCH resources.

As another example, based on Table 25, when 120 kHz SCS is used and the 400 MHz nominal BW (Carrier/BWP BW) is applied, the maximum possible number of FDM resources is up to 7 sets of 35 PRBs (264/35=7.54). Therefore, when the "set of initial CS indexes" of FIG. 12 has two elements (indexes 0, 3, 7, 11 in FIG. 12), a total of 14 PUCCH resources with $r_{PUCCH}$ ranging from 0 to 13 in one PUCCH resource set may be configured as valid PUCCH resources.

The BS and the UE pre-recognize this configuration, and the BS indicates PUCCH resources to allow the UE to select a valid PUCCH resource according to the SCS and the size of the nominal BW (Carrier/BWP BW). The UE does not expect an invalid PUCCH resource to be indicated by the BS.

[Method 3-2-1-A]: Configuring non-overlapping PUCCH resources in the frequency domain to be valid, starting with the lowest PUCCH resource, and indicating, by the BS, the number of PRBs for initial PUCCH transmission Method 1 is to calculate and pre-determine the minimum number of PRBs for PUCCH formats 0 and/or 1 in consideration of the PSD requirement and maximum power limit, and select a valid PUCCH resource in the initial PUCCH resource set accordingly. In addition, the BS may indicate to the UE the minimum number of PRBs for transmission of PUCCH formats 0 and/or 1 through higher layer signaling (e.g., system information block (SIB)).

The BS may indicate the minimum number of PRBs for transmission of PUCCH formats 0 and/or 1 in consideration of the SCS value and/or the size of the nominal BW (Carrier/BWP BW). As mentioned above, the minimum number of PRBs may be indicated such that a maximum of 8 FDM resources may be secured.

If 8 resources capable of FDM are not secured as a result of calculating the minimum number of PRBs indicated by the BS basedc on the SCS value and/or the size of the nominal BW (Carrier/BWP BW) for PUCCH format 0 and/or 1, the UE may transmit PUCCH formats 0 and/or 1, determining that the resources are valid starting with the lowest PUCCH resource as mentioned in method 1. The UE may not expect an invalid PUCCH resource to be indicated by the BS.

Alternatively, according to the index value of FIG. 12 (or according to the number of elements in the "set of initial CS indexes"), the minimum number of PRBs for PUCCH formats 0 and/or 1 may be individually set. For example, in the case of indexes 0, 3, 7, and 11, the BS set a minimum number of PRBs for PUCCH formats 0 and/or 1 to be small, such that a maximum of 8 FDM resources may be generated. In the case of indexes 1 and 2, the BS sets the minimum number of PRBs for PUCCH formats 0 and/or 1 to a value greater than the minimum number of PRBs for indexes 0, 3, 7, and 11, such that a maximum of 6 FDM resources may be generated.

As an example, based on Table 25, when 120 kHz SCS is used and the 200 MHz nominal BW (Carrier/BWP BW) is applied, the minimum number of PRBs may be set to 16 for indexes 0, 3, 7, and 11 in FIG. 12. In this case, the maximum possible number of FDM resources becomes 132/16=8.25, and thus PUCCH resources 0 to 15 may all be valid resources. For indexes 1 and 2 in FIG. 12, the minimum number of PRBs may be set to 22. In this case, the maximum possible number of FDM resources becomes 132/22=6, and thus PUCCH resources 0 to 15 may all be valid resources. Finally, for indexes 4, 5, 6, 8, 9, 10, 12, 13, 14, and 15 in FIG. 12, the minimum number of PRBs may be set to 33. In this case, the maximum possible number of FDM resources becomes 132/33=4, and thus PUCCH resources 0 to 15 may all be valid resources.

As another example, based on Table 25, when 120 kHz SCS is used and the 400 MHz nominal BW (Carrier/BWP BW) is applied, the minimum number of PRBs may be set to 33 for index 0, 3, 7, 11 in FIG. 12. In this case, the maximum possible number of FDM resources becomes 264/33=8, and thus PUCCH resources 0 to 15 may all be valid resources. For the remaining indexes in FIG. 12, the minimum number of PRBs may be set to 35, and a maximum of 6 or 4 FDM resources may be secured.

[Method 3-2-2]: Configuring non-overlapping PUCCH resources in the frequency domain to be valid, starting with the lowest PUCCH resource, and additionally indicating TDM/CDM resources for insufficient PUCCH resources In NR-U, when PUCCH formats 0 and/or 1 are transmitted in an interlaced PRB structure, TDM or CDM resources are additionally indicated. As an example, a method of adding one more starting symbol index and a method of adding one more OCC index are supported.

Similarly, in the FR4 band, the minimum number of PRBs for PUCCH formats 0 and/or 1 may be pre-calculated and determined in consideration of PSD requirement and maximum power limit as in Method 1. Based on the determined minimum number of PRBs, PUCCH resources configured to be valid may be first used, and the remaining PUCCH resources may be configured by adding a starting symbol index and/or OCC index (until a total of 16 PUCCH resources are created for each index).

Additionally, the BS be configured to indicate the minimum number of PRBs. Under the assumption candidate values that may be indicated by the BS are preconfigured and the UE and the BS pre-recognize the same, a PUCCH resource with which application of the starting symbol index or OCC index starts may be defined based on the SCS value and/or the nominal BW (Carrier/BWP BW) value, etc.

The methods proposed above may include a method for generating a CS value that may replace the CS value to be used for indication of HARQ-ACK and/or positive/negative SR when a new ZC sequence length is defined for enhancement of PUCCH formats 0 and/or 1. This method may also be applied to the initial PUCCH resource set.

As an example, when the method of determining CS values based on the total number of REs occupied by a ZC sequence to be newly introduced is applied among the above-mentioned methods, the applicable CS values may be {0, 35, 70, 105, 140, 175, 210, 245, 280, 315, 350, 385} when it is assumed that the length-419 ZC sequence occupying 420 REs is used for PUCCH format 0 and/or 1 (i.e., when SCS is 120 kHz), Therefore, the CS values should also be reflected in the table (FIG. 12) for determining the initial PUCCH resource. That is, in FIG. 12, {0, 3} may be replaced with {0, 105}, {0, 4, 8} may be replaced with {0, 140, 280}, {0, 6} may be replaced with {0, 210}, and {0, 3, 6, 9} may be replaced with {0, 105, 210, 315}, respectively. FIG. 14 shows the result of the replacement.

As another example, when the method of determining CS values based on the length of a ZC sequence to be newly introduced is applied among the aforementioned methods, $\lfloor 211/12 \rfloor =17$ may be used as a difference between applicable CS values when it is assumed that the length-211 ZC sequence occupying 216 REs is used for PUCCH format 0 and/or 1 (i.e., the SCS is 240 kHz). That is, {0, 17, 34, 51, 68, 85, 102, 119, 136, 153, 170, 187} may be used as the applicable CS values. Therefore, the CS values should also be reflected in the table (FIG. 12) for determining the initial PUCCH resource. That is, in FIG. 12, {0, 3} may be replaced with {0, 51}, {0, 4, 8} may be replaced with {0, 68, 136}, {0, 6} may be replaced with {0, 102}, and {0, 3, 6, 9} may be replaced with {0, 51, 102, 153}, respectively. FIG. 15 shows the result of the replacement.

While FIGS. 14 and 15 illustrate the examples based on the same sequence length (i.e., the same SCS for PUCCH), the examples of FIGS. 14 and 15 may be modified and/or configured to use an independent sequence length for each index (that is, an independent SCS for PUCCH). In this case, the CS value for each index may be replaced with a CS value suitable for the sequence length.

3.3. Sequence Repetition for Enhanced PUCCH Format 0/1 for Above 52.6 GHz

When PUCCH format 0/1 is indicated in an interlaced structure in NR-U, $m_{int}=5*n_{IRB}$ is defined as a CS value to be applied to PRBs constituting each interlace in addition to the starting CS (cyclic shift) value defined in the existing NR, such that different CS values may be used in respective PRBs (that is, the CS value is set to increase by 5 for each PRB) (TS38.211). This has been introduced to enhance PAPR/CM performance.

In FR4, contiguous mapping is considered instead of interlace structure unlike in NR-U. To this end, a method of sequence repetition with different CS values may be considered, and thus the following methods are proposed.

[Method 3-3-1]: A method for setting the starting CS value when CGS of other lengths than the length-12 CGS is used In the existing NR, PUCCH formats 0 and/or 1 use a length-12 CGS (computer generated sequence). In NR-U, the PRB level interlace structure is considered, and accordingly the length-12 CGS is repeatedly transmitted in the interlace structure.

In FR4, contiguous mapping is considered instead of the interlace structure. In addition, PUCCH format 0/1 capable of occupying multiple PRBs due to the PDS requirement and maximum power limit is being considered. Accordingly, repeated transmission in the frequency domain using the CGS of other lengths (e.g., Length-6 CGS, Length-18 CGS, Length-24 CGS) than the length-12 CGS may be considered. In order to enhance PAPR/CM performance, it is necessary to define a delta value that allows different CS values to be used for respective repetitions. That is, as in $m_{int}=5\ n_{IRB}^H$ of FIG. 16, when delta is 5 in the length-12 CGS, 5 may be reused as delta when the length-12 CGS is repeatedly transmitted and contiguous mapping is performed. When the CGS of another length is repeatedly transmitted and subjected to contiguous mapping, a similar delta value needs to be defined.

As the value of delta, a value that is coprime to the sequence length may be selected. Among the coprime values, a value exhibiting the best PAPR/CM performance improvement may be selected as delta.

As an example, for the length-6 CGS, when {1, 5}, which are coprime to 6, and {2, 3}, which is a control group, are used as delta, the CS value and PAPR/CM performance for each repetition may be obtained as shown in Table 27. Here, the CS value for each repetition means a CS value in the n-th sequence when the length-6 CGS is repeated N times (where n=1, 2, 3, . . . , N). In this case, the CS value in the n-th repeated sequence may be obtained as ((n−1)*delta) mod (sequence length). For example, when delta is 5, the CS value in the sixth repeated sequence is (6−1)*5 mod 6=1.

As a result, performance is found good when 1 and 5, which are coprime to sequence length 6, are selected as delta, and performance is found better when 1 is selected as delta than when 5 is selected. Therefore, when the length-6 CGS is repeatedly transmitted, the CS value 1 or 5 may be used. Specifically, 1 may be used.

TABLE 27

| Delta | CS value for each repetition | PAPR (dB) | CM (dB) |
|---|---|---|---|
| 1 | {0, 1, 2, 3, 4, 5} | 3.198345 | 1.566 |
| 2 | {0, 2, 4, 0, 2, 4} | 5.560008 | 4.579 |
| 3 | {0, 3, 0, 3, 0, 3} | 6.571037 | 7.026 |
| 5 | {0, 5, 4, 3, 2, 1} | 3.21909 | 1.742 |

As another example, for the length-18 CGS, when {1, 5, 7, 11, 13, 17}, which are coprime to 18, and {2, 3}, which is a control group, are used as delta, the CS value and PAPR/CM performance for each repetition may be obtained as shown in Table 28. Here, the CS value for each repetition means a CS value in the n-th sequence when the length-18 CGS is repeated N times (where n=1, 2, 3, . . . , N). In this case, the CS value in the n-th repeated sequence may be obtained as ((n−1)*delta) mod (sequence length). For example, when delta is 5, the CS value in the sixth repeated sequence is (6−1)*5 mod 18=7.

As a result, performance is found good when {1, 5, 7, 11, 13, 17}, which are coprime to sequence length 18, are selected as delta, and performance is found better when 13 is selected as delta than when the other values are selected. Therefore, when the length-18 CGS is repeatedly transmitted, one of the CS values {1, 5, 7, 11, 13, 17} may be used. Specifically, 13 may be used.

TABLE 28

| Delta | CS value for each repetition | PAPR (dB) | CM (dB) |
|---|---|---|---|
| 1 | {0, 1, 2, 3, 4, 5, 6, 7, 8, 9, 10, 11 12, 13, 14, 15, 16, 17} | 3.229425 | 1.38 |
| 2 | {0, 2, 4, 6, 8, 12, 14, 16, 0, 2, 4, 6, 8, 12, 14, 16} | 5.51267 | 4.224 |
| 3 | {0, 3, 6, 9, 12, 15, 0, 3, 6, 9, 12, 15, 0, 3, 6, 9, 12, 15} | 6.677797 | 6.709 |
| 5 | {0, 5, 10, 15, 2, 7, 12, 17, 4, 9, 14, 1, 6, 11, 16, 3, 8, 13} | 3.299061 | 1.25 |
| 7 | {0, 7, 14, 3, 10, 17, 6, 13, 2, 9, 16, 5, 12, 1, 8, 15, 4, 11} | 3.223227 | 1.346 |
| 11 | {0, 11, 4, 15, 8, 1, 12, 5, 16, 9, 2, 13, 6, 17, 10, 3, 14, 7} | 3.243854 | 1.3 |
| 13 | {0, 13, 8, 3, 16, 11, 6, 1, 14, 9, 4, 17, 12, 7, 2, 15, 10, 5} | 3.247967 | 1.262 |
| 17 | {0, 17, 16, 15, 14, 13, 12, 11, 10, 9, 8, 7, 6, 5, 4, 3, 2, 1} | 3.245911 | 1.371 |

As another example, for the length-24 CGS, when {1, 5, 7, 11, 13, 17, 19, 23}, which are coprime to 24, and {2, 3}, which is a control group, are used as deltas, the CS value and PAPR/CM performance for each repetition may be obtained as shown in FIG. 29. Here, the CS value for each repetition means a CS value in the n-th sequence when the length-24 CGS is repeated N times (where n=1, 2, 3, . . . , N). In this case, the CS value in the n-th repeated sequence may be obtained as ((n−1)*delta) mod (sequence length). For example, when delta is 5, the CS value in the sixth repeated sequence is (6−1)*5 mod 24=1.

As a result, performance is found good when {1, 5, 7, 11, 13, 17, 19, 23}, which are coprime to sequence length 24, are selected as delta, and performance is found better when 13 is selected as delta than when the other values are selected. Therefore, when the length-24 CGS is repeatedly transmitted, one of the CS values {1, 5, 7, 11, 13, 17, 19, 23} may be used. Specifically, the CS value of 13 may be used.

TABLE 29

| Delta | CS value for each repetition | PAPR (dB) | CM (dB) |
|---|---|---|---|
| 1 | {0, 1, 2, 3, 4, 5, 6, 7, 8, 9, 10, 11, 12, 13, 14, 15, 16, 17, 18, 19, 20, 21, 22, 23} | 3.183764 | 1.293 |
| 2 | {0, 2, 4, 6, 8, 10, 12, 14, 16, 18, 20, 22, 0, 2, 4, 6, 8, 10, 12, 14, 16, 18, 20, 22} | 5.518768 | 4.038 |
| 3 | {0, 3, 6, 9, 12, 15, 18, 21, 0, 3, 6, 9, 12, 15, 18, 21, 0, 3, 6, 9, 12, 15, 18, 21} | 6.766479 | 6.865 |
| 5 | {0, 5, 10, 15, 20, 1, 6, 11, 16, 21, 2, 7, 12, 17, 22, 3, 8, 13, 18, 23, 4, 9, 14, 19} | 3.229425 | 1.276 |
| 7 | {0, 7, 14, 21, 4, 11, 18, 1, 8, 15, 22, 5, 12, 19, 2, 9, 16, 23, 6, 13, 20, 3, 10, 17} | 3.243854 | 1.306 |
| 11 | {0, 11, 22, 9, 20, 7, 18, 5, 16, 3, 14, 1, 12, 23, 10, 21, 8, 19, 6, 17, 4, 15, 2, 13} | 3.22736 | 1.261 |
| 13 | {0, 13, 2, 15, 4, 17, 6, 19, 8, 21, 10, 23, 12, 1, 214, 3, 16, 5, 18, 7, 0, 9, 22, 11} | 3.17541 | 1.22 |
| 17 | {0, 17, 10, 3, 20, 13, 6, 23, 16, 9, 2, 19, 12, 5, 22, 15, 8, 1, 18, 11, 4, 21, 14, 7} | 3.239736 | 1.297 |
| 19 | {0, 19, 14, 9, 4, 23, 18, 13, 8, 3, 22, 17, 12, 7, 2, 21, 16, 11, 6, 1, 20, 15, 10, 5} | 3.239736 | 1.297 |
| 23 | {0, 23, 22, 21, 20, 19, 18, 17, 16, 15, 14, 13, 12, 11, 10, 9, 8, 7, 6, 5, 4, 3, 2, 1} | 3.190019 | 1.273 |

[Method 2]: A method for setting the starting CS value when CGS is repeatedly transmitted more times than the sequence length It has been described above that when the length-12 CGS is repeatedly transmitted in the frequency domain, a CS value may be set differently for each repeatedly transmitted sequence in order to enhance PAPR/CM performance. In this regard, it has been described above that 5 used in the existing standard may be reused as a value of delta. PAPR/CM performance obtained while maintaining delta as 5 when the length-12 CGS is repeatedly transmitted up to 35 times is shown in FIG. 17. Referring to FIG. 17, when the number of repeated transmissions is equal or similar to the sequence length, that is, when many different CS values are maintained, a gain may be obtained in terms of PAPR/CM performance. Regarding the CS value for each repeated transmission when repeated transmission is performed 35 times, which has the worst performance, the same CS value is obtained for every 12th sequence in the form of {0, 5, 10, 3, 8, 1, 6, 11, 4, 9, 2, 7, 0, 5, 10, 3, 8, 1, 6, 11, 4, 9, 2, 7, 0, 5, 10, 3, 8, 1, 6, 11, 4, 9, 2}.

Methods proposed below are based on the length-12 CGS as an example. Similar methods may be applied to length-6, length-18, and length-24 CGSs.

As a first configuration method, a new value of delta may be applied after every specific number of repetitions (e.g., repeated transmission is performed as many times as an integer multiple of the sequence length). That is, a new delta value may be applied whenever repeated transmission is performed as many times as an integer multiple of the sequence length. when a length-L sequence is repeated, a first delta value may be used for the first L repeated transmissions, a second delta value may be used for the L+1-th to 2L-th repeated transmissions, and a third delta value may be used for the 2L+1-th to 3L-th repeated transmissions.

As an example, referring to the result of FIG. 18, when the length-12 CGS is repeated 35 times, delta 5, which is the first delta, may be used for the first 12 repeated transmissions, delta 7 may be used for the 13th to 24th repeated transmissions, and delta 1 may be used for the 25th to 36th repeated transmissions. As another example, referring to the result of FIG. 18, when the length-12 CGS is repeated 24 times, delta 5, which is the first delta, may be used for the first 12 repeated transmissions, and delta 1 may be used for the 13th to 24th repeated transmissions.

As another configuration method, a phase shift pattern may be applied together with or separately from the CS values using the delta. Specifically, a phase shift pattern may be applied in a sequence level. FIG. 19 may show performance obtained when the phase shift is applied in the pattern of [1, 1, −1] and the pattern of [1, −1, −1] (In this case, a configuration may be established such that the phase shift occurs by {0, π/4, 2π/4, 3π/4} in order of {1, 0+1i, −1, 0−1i}). Here, each phase shift value is applied in the sequence level (i.e., the value is changed every 12 PRBs).

It may be seen from the actual experimental results that the PAPR/CM performance is improved compared to the method in which the delta is changed when the number of PRBs is 28 or more. Accordingly, when the number of PRBs is greater than or equal to a specific value (e.g., 28), a sequence-level phase shift may be considered. In this case, the phase shift values to be applied are [1, 1, −1] or [1, −1, −1].

As another configuration method, the sequence mapping order may be changed together with or separately from the CS values using the delta. As an example, the mapping order may be inversely applied in the sequence level. the PAPR/CM performance obtained when the mapping order is applied differently in the sequence level is shown in FIG. 20. In this case, mapping may be performed in normal order for up to 24, the number of PRBs (i.e., 2 repetitions of sequence transmission), and may be inversely performed from 25, the number of PRBs (i.e., from the third repeated transmission of the sequence). It may be seen that the PAPR/CM performance is improved when the inverse mapping is used compared to the case wehre mapping is always performed in the normal order. Accordingly, the inverse mapping scheme may be considered to improve PAPR/CM performance.

[Method 3-3-3]: Configuring one of use of a single ZC sequence and repetitive transmission of a CGS as a sequence of PUCCH format 0/1 according to the size of the frequency domain region FIG. 21 shows PAPR/CM performance obtained when the method of repeatedly transmitting a length-12 CGS sequence and the method of using a single ZC sequence are used for PUCCH format 0/1 according to the PUCCH resource size in the frequency domain. Although the method of changing only the delta value (i.e., CS) is considered in the repeated transmission of CGS mentioned below, the other methods mentioned above may also be used.

In terms of PAPR, when 13, 14, and 15 PRBs are used for PRBs for PUCCH resources, repeated transmission of length-12 CGS (delta=5, 5, 5) has good performance. In terms of CM, when the number of PRBs used for PUCCH resources is 9, 10, . . . , or 24, repeated transmission of length-12 CGS (delta=5, 5, 5) has good performance. Therefore, the following method may be proposed according to the experimental results.

1. When the PUCCH resource size in the frequency domain for PUCCH format 0/1 is less than or equal to M PRBs, a CGS may be repeatedly transmitted. When the size exceeds M PRBs, a single ZC sequence may be used.

1-A. For example, when M is 24, if a region smaller than 24 PRBs is allocated as resources for PUCCH format 0/1, the length-12 CGS may be repeatedly transmitted. If a region larger than 24 PRBs is allocated as resources for PUCCH format 0/1, a single ZC sequence may be used.

1-A-i. In this regard, when the length-12 CGS is repeatedly transmitted, the delta value to be used may be 5.

2. When the PUCCH resource size in the frequency domain for PUCCH format 0/1 is included in a specific range (i.e., the size is greater than or equal to X PRBs and less than or equal to Y PRBs), a CGS may be repeatedly transmitted. In other range, a single ZC sequence may be used.

2-A. As an example, in the case where the specific range is from 9 PRBs to 24 PRBs, when a region larger than or equal to 9 PRBs and smaller than or equal to 24 PRBs is allocated as a resource for PUCCH format 0/1, the length-12 CGS may be repeatedly transmitted. When a region smaller than 9 PRBs or larger than 24 PRBs is allocated as a resource for PUCCH format 0/1, a single ZC sequence may be used.

2-A-i. In this regard, when the length-12 CGS is repeatedly transmitted, the delta value to be used may be 5.

3. The BS may configure/indicate whether to use a single ZC sequence or to repeatedly transmit a CGS for each PUCCH resource for PUCCH format 0/1.

3-A. As an example, when the BS determines that the performance will be good when a single ZC sequence is used for the frequency domain amount of the PUCCH resource, it may configure/indicate use of the single ZC sequence. when the BS determines that the performance will be good when a CGS is repeatedly transmitted for the frequency domain amount of the PUCCH resource, it may configure/indicate repeated transmission of the CSG.

3-B. The UE may transmit PUCCH format 0/1 through the selected PUCCH resource using the sequence transmission method configured/indicated by the BS.

Cyclic shift cycling used for PUCCH format 0/1 in NR-U is limited to the interlace structure. That is, as described in section 6.3.2.2.2 of 3GPP TS 38.211, $m_{int}$ of the N-th PRB (where N=0, 1, . . . , 9 (or 10)) among the PRBs allocated as interlaced resources is N*5, and is used to change the CS.

However, in the above 52.6 GHz band, the following operation may be required because the interlace structure is not considered, but the contiguous PRB structure is considered.

The operation proposed below is basically a method of mapping $m_{int}$ to a CS value with a difference of a specific delta (e.g., 5) according to the PRB index order in all methods.

[Proposed method 3-3-3A] Calculating mint by pre-allocating a logical index within PUCCH resources (e.g., a total of N resources) allocated by the BS A. As a first example, for each hop among PUCCH resources, the PRB located at the lowest position in the frequency domain is set to PRB index 0, and the PRB located at the highest position is set to index N−1.

A-i. In other words, in this method, the starting PUCCH RB index configured/indicated by the BS is $n_{PUCCHPRB}^{\mu}=0$ and $n_{PUCCHPRB}^{\mu}$ is increased by 1 whenever the RB index increases by 1.

B. As a second example, for each hop among PUCCH resources, the PRB located at the highest position in the frequency domain is set to PRB index 0, and the PRB located at the lowest position is set to index N−1.

B-i. In other words, in this method, the ending PUCCH RB index configured/indicated by the BS is $n_{PUCCHPRB}^{\mu}=0$ and $n_{PUCCHPRB}^{\mu}$ is decreased by 1 whenever the RB index decreases by 1.

C. The above two examples may be configured/applied individually or in combination according to frequency hopping.

C-i. For example, the first example may be applied to the lower hop, and the second example may be applied to the upper hop. Alternatively, the second example may be applied to the lower hop, and the first example may be applied to the upper hop. Alternatively, the same example may be applied to both hops (i.e., lower hop & upper hop).

D. As a third example, for both hops (lower hop & upper hop) that may be occupied by PUCCH resources, the PRB located at the lowest position in the frequency domain is set to PRB index 0, and the PRB located at the highest position is set to index 2N−1.

D-i. In other words, in this example, the starting PUCCH RB index configured/indicated by the BS is set to $n_{PUCCHPRB}^{\mu}=0$, and $n_{PUCCHPRB}^{\mu}$ is increased by 1 whenever the RB index increases by 1. The last RB index of the lower hop is $n_{PUCCHPRB}^{\mu}=N-1$. Subsequently, the first RB index of the upper hop is set to $n_{PUCCHPRB}^{\mu}=N$, and $n_{PUCCHPRB}^{\mu}$ is increased by 1 whenever the RB index increases by 1. The last RB index of the upper hop is $n_{PUCCHPRB}^{\mu}=2N-1$.

E. As a fourth example, for both hops (lower hop & upper hop) that may be occupied by the PUCCH resources, the PRB located at the highest position in the frequency domain is set to PRB index 0. The PRB located at the lowest position is set to index 2N−1.

E-i. In other words, in this example, the starting PUCCH RB index configured/indicated by the BS is set to $n_{PUCCHPRB}^{\mu}=2N-1$, and $n_{PUCCHPRB}^{\mu}=2N-1$ is decreased by 1 whenever the RB index increases by 1. The last RB index of the lower hop is $n_{PUCCHPRB}^{\mu}=N$. Subsequently, the first RB index of the upper hop is set to $n_{PUCCHPRB}^{\mu}=N-1$, and $n_{PUCCHPRB}^{\mu}$ is decreased by 1 whenever the RB index increases by 1. The last RB index of the upper hop is $n_{PUCCHPRB}^{\mu}=0$.

F. As a result, $m_{int}$ may be $delta*n_{PUCCHPRB}^{\mu}$. Here, $n_{PUCCHPRB}^{\mu}$ may be a logical PRB index in a predetermined PUCCH resource as in the above example.

F-i. When a parameter in the existing spec is reused, $n_{PUCCHPRB}^{\mu}$ in the example above may be replaced with $n_{IRB}^{\mu}$.

G. With this method, the BS may appropriately indicate the value of $m_0$ for each PUCCH resource in order to use misaligned RB allocation.

H. Configuring this method according to a scheme most similar to that of NR-U (i.e., a method in which a CS value is set differently according to the PRB order in the entire PUCCH resource)

[Proposed method 3-3-3B] Calculating $m_{int}$ based on a physical index (e.g., CRB index or PRB index in a BWP) corresponding to the PUCCH resource allocated by the BS A. As an example, based on the CRB index, $m_{int}$ may be $m_{int}=delta*n_{CRB}^{\mu}$.

B. As another example, based on the PRB index in the BWP, $m_{int}$ may be $m_{int}=delta*n_{PRB}^{\mu}$.

C. With this method, additional signaling may not be required for the BS to use misaligned RB allocation.

As proposed above, when the delta value is changed for every specific number of PRBs (e.g., 12 PRBs in the case of L12-CGS), the changed delta value may also be applied to the proposed methods A and B for every specific number of PRBs.

Additionally, the methods proposed for PUCCH transmission may be equally applied to resource configuration of other UL signals/channels (e.g., SRS, etc.). As an example, in configuring resources for SRS transmission, the BS may indicate the above proposed methods to the UE, and the UE may transmit SRS according to the indicated method.

In addition, examples of the above-described proposed methods may also be included as one of the implementation methods of the present disclosure, and therefore it is apparent that they may be regarded as a kind of proposed methods.

In addition, the above-described proposed methods may be implemented independently, or may be implemented by combining (or merging) some of the proposed methods. A rule may be defined such that the BS may provide the UE with information about whether the proposed methods are to be applied (or information about the rules of the proposed methods) through a predefined signal (e.g., a physical layer signal or a higher layer signal). The higher layer may include, for example, one or more of functional layers such as MAC, RLC, PDCP, RRC, and SDAP.

Methods, embodiments or descriptions for implementing the method proposed in the present disclosure may be applied separately, or one or more of the methods (or embodiments or descriptions) may be applied in combination.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

FIG. 22 is a diagram illustrating a DRX cycle (RRC_CONNECTED state).

Referring to FIG. 22, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 30 describes a UE operation related to DRX (in the RRC_CONNECTED state). Referring to Table 30, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 22.

TABLE 30

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before or after the operations described in each embodiment of the present disclosure, the UE may perform a DRX-related operation. For example, the UE may perform the DRX operation before or after PUCCH transmission operates according to the above-described embodiment.

Implementation Example

FIG. 23 is a flowchart of a signal transmission/reception method according to embodiments of the present invention.

The implementation example of FIG. 23 is configured with reference to Method 3-2-1-A of Section 3.2.

Referring to FIG. 23, embodiments of the present disclosure may be performed by a UE, and include receiving an SIB including information on a PUCCH resource (S2301), transmitting a PUCCH based on the information on the PUCCH resource while the UE does not have a dedicated PUCCH resource configuration (S2303), and after establishing an RRC connection, monitoring a PDCCH based on a configured DRX operation.

For example, referring to the structure proposed in Section 3.2, one of the 16 PUCCH resource sets in FIG. 12 may be selected, and the PUCCH resource may be determined as one of 16 PUCCH resources ($r_{PUCCH}$) in the selected PUCCH resource set.

The PUCCH resource sets of FIG. 12 are for PUCCH resource sets before dedicated PUCCH resource configuration, that is, initial resource sets. Referring to the conventional document 3GPP TS 38.213, using the PUCCH resource sets by the UE before the dedicated PUCCH resource configuration means using the PUCCH resource sets based on a common PUCCH resource configuration (pucch-ResourceCommon). In other words, it means that the UE uses PUCCH sets while the UE does not have dedicated PUCCH resource configuration. The PUCCH resource sets before the dedicated PUCCH resource configuration may be expressed as PUCCH resource sets prior to RRC configuration.

Accordingly, the UE may receive information on the PUCCH resource through the SIB and transmit a PUCCH based on the information on the PUCCH resource while not having a dedicated PUCCH resource configuration. In addition, as described with reference to FIG. 22, when the RRC connection is established after the PUCCH transmission, the UE may perform the DRX operation.

In addition, the information on the PUCCH resource in FIG. 23 includes information on the number of PRBs of the PUCCH resource.

Specifically, referring to Section 3.2, the BS indicates the minimum number of PRBs to the UE in consideration of the BW size, etc., and the UE configures frequency resources within the BW, considering the minimum number of PRBs as the number of PRBs per PUCCH resource.

For example, the BS indicates #of PRBs, i.e., the minimum number of PRBs in the configurations of Tables 25 and/or 26, through the SIB. Referring to the description in section 3.2 and Table 14, the #of PRBs in Tables 25 and/or 26 is the minimum PRB in Table 14 in Section 3.1, and the minimum PRB may be allocated to one PUCCH resource in Method 3-2-1. Referring to Method 3-2-1-A, #of PRBs in Tables 14, 25 and 26 are examples in consideration of regulations in each country, and the BS may determine the value of #of PRBs and indicate the same through the SIB. Therefore, in Method 3-2-1-A, the minimum number of PRBs indicated by the BS through the SIB is the same as the number of PRBs included in one PUCCH resource used when the UE transmits the PUCCH.

Referring to Section 3.2, the PUCCH resources described in this section are related to PUCCH resources included in the PUCCH resource set before the dedicated PUCCH resource configuration associated with FIG. 12 (for a case where a dedicated PUCCH resource is not configured). Therefore, the BS may transmit information on the number of PRBs through the SIB before configuring a dedicated PUCCH resource for the UE.

Referring to Section 3.1, when the minimum number of PRBs is set, a long sequence corresponding to the minimum number of PRBs is used for the PUCCH. For example, the UE may use one sequence corresponding to the number of PRBs per PUCCH resource configured by the SIB in generating the PUCCH.

Referring to Method 3-2-1-A, the PUCCH resource may be a resource for the PUCCH, which may be one of PUCCH formats 0 and 1.

Referring to Method 3-2-1-A, the UE does not expect that an invalid PUCCH resource is indicated by the BS. For example, an invalid resource among the 16 PUCCH resources included in the PUCCH resource set may not be allocated to the UE.

A method of determining whether a PUCCH resource is valid is disclosed in Methods 3-2-1 and 3-2-1-A. For example, the number of frequency resources that may be FDMed in a bandwidth may be calculated based on the number of PRBs of the PUCCH resource indicated by the BS and the total number of RBs in the bandwidth. The number of valid PUCCH resources may be determined based on the calculated number of frequency resources that may be FDMed and the number of CS indexes included in the set of initial CS indexes for each index of FIG. 12 (for each PUCCH resource set). More specifically, the product of the number of resources that may be FDMed and the number of CS indexes may be the number of valid PUCCH resources.

In addition to the operations described with reference to FIG. 23, one or more of the operations described with reference to FIGS. 1 to 22 and/or the operations described with reference to sections 1 to 3 may be combined and additionally performed. For example, the UE may perform uplink LBT before transmission of the PUCCH.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 24 illustrates a communication system 1 applied to the present disclosure.

Referring to FIG. 24, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 25 illustrates wireless devices applicable to the present disclosure.

Referring to FIG. 25, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 26 illustrates another example of a wireless device applied to the present disclosure. The wireless device may be implemented in various forms according to a use case/service (refer to FIG. 24).

Referring to FIG. 26, wireless devices 100 and 200 may correspond to the wireless devices 100 and 200 of FIG. 25 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 19), the vehicles (100*b*-1 and 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcasting terminal, a hologram device, a public safety device, an MTC device, a medical device, a FinTech device (or a finance device), a security device, a climate/environment device, the AI server/device (400 of FIG. 24), the BSs (200 of FIG. 24), a network node, or the like. The wireless device may be mobile or fixed according to a use case/service.

In FIG. 26, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof Example of Vehicle or Autonomous Driving Vehicle to which the Present Disclosure is Applied FIG. 27 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method for transmitting a signal by a user equipment (UE) in a wireless communication system, the method comprising:
   receiving a System Information Block (SIB) including information on a Physical Uplink Control Channel (PUCCH) resource; and
   transmitting a PUCCH based on the information on the PUCCH resource if the UE does not have a dedicated PUCCH resource configuration,
   wherein the information on the PUCCH resource includes a parameter providing a number of Physical Resource Blocks (PRBs) of the PUCCH resource, and
   wherein the PUCCH is one of PUCCH formats 0 and 1.

2. The method of claim 1, wherein the PUCCH is generated based on one PUCCH sequence of a length corresponding to the number of PRBs.

3. The method of claim 1, wherein the PUCCH resource is included in a PUCCH resource set including 16 PUCCH resources,
   wherein invalid PUCCH resources among the 16 PUCCH resources are not allocated.

4. The method of claim 3, wherein validity of the PUCCH resource is determined based on:
   (i) the number of PRBs in the PUCCH resource;
   (ii) a total number of RBs in a bandwidth; and
   (iii) a set of initial cyclic shift (CS) indexes corresponding to the PUCCH resource set.

5. A user equipment (UE) for transmitting a signal in a wireless communication system, the UE comprising:
   at least one transceiver;
   at least one processor; and
   at least one memory operatively connected to the at least one processor and storing instructions that, when executed, cause the at least one processor to perform a specific operation,
   wherein the specific operation comprises:
   receiving a System Information Block (SIB) including information on a Physical Uplink Control Channel (PUCCH) resource; and
   transmitting a PUCCH based on the information on the PUCCH resource if the UE does not have a dedicated PUCCH resource configuration,
   wherein the information on the PUCCH resource includes a parameter providing a number of Physical Resource Blocks (PRBs) of the PUCCH resource, and
   wherein the PUCCH is one of PUCCH formats 0 and 1.

6. The UE of claim 5, wherein the PUCCH is generated based on one PUCCH sequence of a length corresponding to the number of PRBs.

7. The UE of claim 5, wherein the PUCCH resource is included in a PUCCH resource set including 16 PUCCH resources,
   wherein invalid PUCCH resources among the 16 PUCCH resources are not allocated.

8. The UE of claim 7, wherein validity of the PUCCH resource is determined based on:
   (i) the number of PRBs in the PUCCH resource;
   (ii) a total number of RBs in a bandwidth; and
   (iii) a set of initial cyclic shift (CS) indexes corresponding to the PUCCH resource set.

\* \* \* \* \*